United States Patent
Ohgitani et al.

(10) Patent No.: US 8,925,983 B2
(45) Date of Patent: Jan. 6, 2015

(54) LOCKING APPARATUS FOR VEHICLE

(75) Inventors: Ikkei Ohgitani, Aichi-ken (JP); Yoshio Ojima, Aichi-ken (JP); Takahiro Fukagawa, Aichi-ken (JP); Takashi Murase, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 213 days.

(21) Appl. No.: 13/525,721

(22) Filed: Jun. 18, 2012

(65) Prior Publication Data

US 2012/0321381 A1 Dec. 20, 2012

(30) Foreign Application Priority Data

Jun. 20, 2011 (JP) ................. 2011-136799
Jun. 20, 2011 (JP) ................. 2011-136802
Nov. 4, 2011 (JP) ................. 2011-241882

(51) Int. Cl.
*E05C 3/06* (2006.01)
*B60S 5/06* (2006.01)
*B60K 1/04* (2006.01)
*E05C 3/16* (2006.01)

(52) U.S. Cl.
CPC ... *B60S 5/06* (2013.01); *B60K 1/04* (2013.01); *B60K 2001/0438* (2013.01); *B60K 2001/0472* (2013.01); *Y02T 90/124* (2013.01)
USPC ............................. 292/216; 292/213; 292/254

(58) Field of Classification Search
USPC .................................. 292/216, 213, 214, 254
See application file for complete search history.

(56) References Cited

U.S. PATENT DOCUMENTS

| | | | |
|---|---|---|---|
| 6,422,616 B1 * | 7/2002 | Wortmann et al. | 292/216 |
| 6,485,071 B2 * | 11/2002 | Schwaiger | 292/216 |
| 7,530,609 B2 * | 5/2009 | Beauchamp et al. | 292/214 |
| 7,574,820 B2 * | 8/2009 | Musso et al. | 37/270 |
| 8,276,950 B2 * | 10/2012 | Kutschat | 292/216 |
| 2011/0068309 A1 | 3/2011 | Haslberger et al. | |

FOREIGN PATENT DOCUMENTS

| | | |
|---|---|---|
| CN | 101987613 A | 3/2011 |
| JP | 09-188143 A | 7/1997 |
| JP | 2002-362261 A | 12/2002 |
| JP | 2003128378 A | 5/2003 |
| JP | 2010-184621 A | 8/2010 |

(Continued)

OTHER PUBLICATIONS

Japanese Office Action issued Apr. 23, 2013 in corresponding Japanese patent application No. 2011-136802.

*Primary Examiner* — Mark Williams
(74) *Attorney, Agent, or Firm* — Sughrue Mion, PLLC

(57) ABSTRACT

A locking apparatus for a vehicle includes a striker, a locking apparatus body. The locking apparatus body is used for locking and releasing the striker. The locking apparatus body includes a housing, a first rocking shaft, a latch and a pawl. The housing includes a recess for receiving the striker. The first rocking shaft is disposed in the housing and has a first axis. The latch is supported by the first rocking shaft so as to be rotatable relative to the housing around the first axis between a locking position in which the latch locks the striker in the recess and a releasing position in which the latch releases the striker in the recess. The pawl is used for locking the latch. The locking apparatus body locks the striker when moving housing to the striker and is operable in the housing.

9 Claims, 25 Drawing Sheets

(56) References Cited

FOREIGN PATENT DOCUMENTS

| JP | 2010-184622 A | 8/2010 |
| JP | 2010-275798 A | 12/2010 |
| JP | 2011042309 A | 3/2011 |

* cited by examiner

LOCKING APPARATUS FOR VEHICLE

BACKGROUND OF THE INVENTION

The present invention relates to a locking apparatus for a vehicle.

An electric vehicle which will be widely used includes a battery for supplying electric power to a drive motor mounted in the electric vehicle. A battery unit includes the battery accommodated in a case and is mounted to the vehicle body. The battery mounted to the vehicle body needs to be recharged when the electric power stored in the battery is consumed and to be replaced periodically. Therefore, various types of battery unit mounting devices for a vehicle have been proposed for effectively completing locking and removing the battery unit to and from the vehicle body not only when manufacturing an electric vehicle but also when using an electric vehicle.

Japanese Patent Application Publications No. 2010-184622 and No. 9-188143 disclose a battery unit mounting device for a vehicle which is used for moving the battery unit to a mounting position below the vehicle body and mounting the battery unit to the vehicle body. The battery unit mounting device for a vehicle disclosed in the Publications No. 2010-184622 and No. 9-188143 includes a mounting device by which the battery unit is moved upward to the mounting position when mounting the battery unit to the vehicle body and moved downward from the monting position when removing the battery unit from the vehicle body and a locking member by which the battery unit is locked and released to and from the vehicle body. The bolt disclosed in the Publication No. 9-188143 serves as the locking member.

According to the battery unit mounting device for a vehicle disclosed in the Publications No. 2010-184622 and No. 9-188143, after the battery unit is moved upward to the mounting position for the vehicle body by the mounting device, the battery unit is fixedly mounted to the vehicle body by the locking member, so that locking of the battery unit to the vehicle body is completed. After the battery unit is released from the vehicle body by the locking device, the battery unit is moved downward from the mounting position by the mounting device, so that removing of the battery unit is completed.

According to the battery unit mounting device, however, when mounting the battery unit to the vehicle body, after the battery unit is moved upward to the mounting position by the mounting device, the battery unit should be locked to the vehicle body by the locking member which is different from the mounting device. Thus, it takes more time and labor for mounting the battery unit to the vehicle body. This tendency becomes remarkable when a bolt is used as the locking member.

Japanese Patent Application Publication No. 2010-275798 discloses a locking device for a vehicle. The locking device includes a base plate, a latch and a pawl. The base plate has formed therein a recess for receiving a striker. The base plate supports the latch in such a manner that the latch is rotatable around the axis of a first rocking shaft between locking state in which the latch is locked to the striker in the recess of the base plate and releasing state in which the latch is released from the striker in the recess. The base plate rotatably supports the pawl so that the pawl is rotatable around the axis of a second rocking shaft between the first position in which the latch is prevented from rotating by the pawl and the second position in which the latch is released from the pawl thereby to rotate. A cable is operatively connected to the pawl. The latch and the pawl have engaging portions, respectively, which are engageable with each other. One end of the latch is linked to one end of the pawl through a coil spring.

According to the locking device disclosed in the Publication No. 2010-275798, the latch is rotated around the axis of the first rocking shaft by the striker in the recess. When the latch is locked by the pawl, the striker is locked by the latch. The pawl is rotated around the axis of the second rocking shaft in accordance with the rotation of the latch due to the urging force of the coil spring. When the pawl is rotated to the first position, the latch and the pawl are engaged with each other at the engaging portions thereof, so that pawl prevents the latch from rotating, with the result that the striker is locked to the locking device.

When releasing the striker from the locking device, operator operates the cable. When the operator operates the cable for releasing the striker, the pawl in the first position is rotated to the second position, and the engaging portion of the latch is released from the engaging portion of the pawl. Then, the latch is rotated by urging force of the coil spring from the locking state to the releasing state. Thus, the striker is released from the latch in the recess, and the striker is also released from the locking device.

The locking device is provided for a vehicle seat assembly including a seat and a seat back which is swingable relative to the seat. In this case, the locking device is provided in the seat back, and the striker is provided in the seat. Fixing the striker by the locking device with the seat back set in its upright position, the vehicle seat may be fixed in its use position. Releasing the striker from the locking device, the seat back becomes swingable, so that the seat and the seat back may be set in parallel relation to each other to be stored in the storage position.

According to the locking device for a vehicle disclosed in the Publication No. 2010-275798, the latch is prevented from rotating only by the pawl and operable from outside of the locking device. If the pawl is rotated for some reason from the first position to the second position, the latch is unexpectedly changed from the locking state to the releasing state. In other words, there is a fear that the striker may be released from the locking device unexpectedly without any operator's will.

The present invention which has been made in light of the above problems is directed to providing a locking apparatus for a vehicle that offers easy and reliable operation.

SUMMARY OF THE INVENTION

In accordance with the present invention, a locking apparatus for a vehicle includes a striker, a locking apparatus body. The locking apparatus body is used for locking and releasing the striker. The locking apparatus body includes a housing, a first rocking shaft, a latch and a pawl. The housing includes a recess for receiving the striker. The first rocking shaft is disposed in the housing and has a first axis. The latch is supported by the first rocking shaft so as to be rotatable relative to the housing around the first axis between a locking position in which the latch locks the striker in the recess and a releasing position in which the latch releases the striker in the recess. The pawl is used for locking the latch. The locking apparatus body locks the striker when moving housing to the striker and is operable in the housing.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

Figure 1:
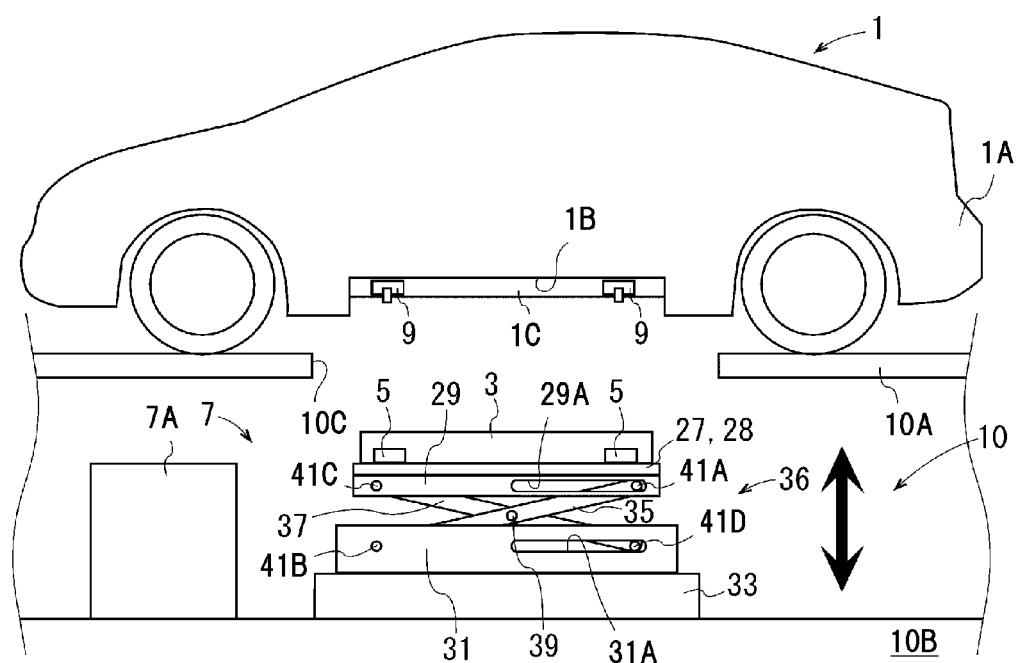
FIG. 1 is a side view of a vehicle body and a battery unit, showing operation of mounting and removing the battery unit to and from the vehicle body according to first through fourth preferred embodiments of the present invention.
Figure 2:
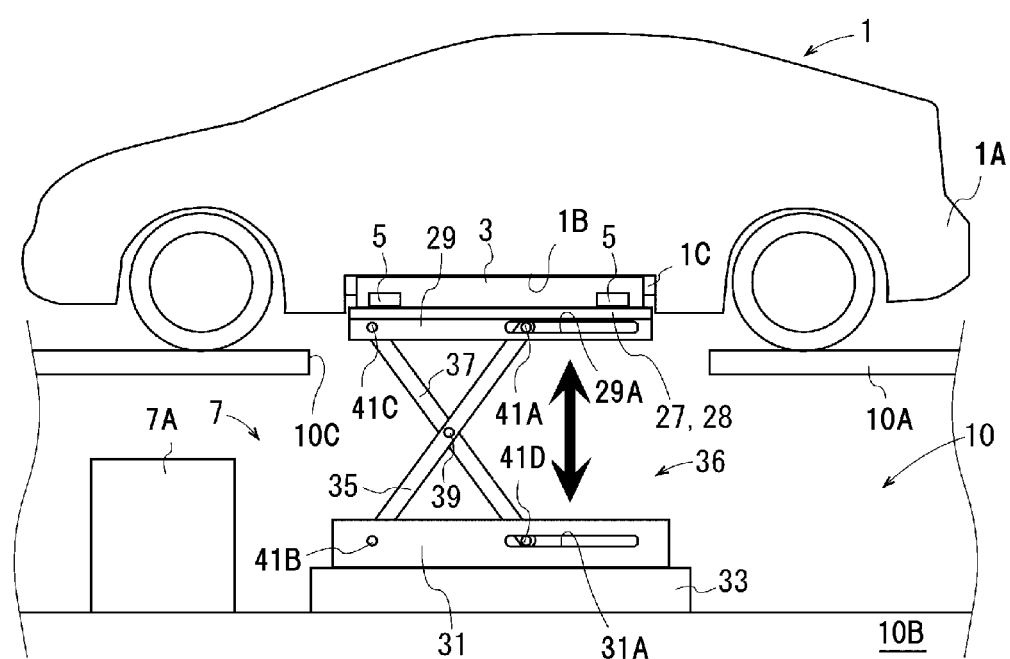
FIG. 2 is a side view similar to FIG. 1, also showing the operation of mounting and removing the battery unit to and from the vehicle body.

The following will describe a locking apparatus for a vehicle that is common to the first through fourth preferred embodiments of the present invention with reference to the accompanying drawings. Referring to FIGS. 1 and 2, reference numeral 1 designates an electric vehicle including a vehicle body 1A. A battery unit mounting apparatus for a vehicle includes the locking apparatus according to the present invention and is used for fixing and removing a battery unit 3 to and from the vehicle body 1A at a battery install station 10 (hereinafter referred to merely as "station").

The station 10 includes an upper floor 10A and a lower floor 10B. The upper floor 10A has formed therethrough an opening 10C through which the battery unit 3 is moved for mounting and removal. A mounting device 7 is disposed on the lower floor 10B just below the opening 10C.

A space 1B is formed in the bottom of the vehicle body 1A for receiving therein the battery unit 3. The vehicle body 1A includes a pair of flames 1C extending along the longitudinal direction of the vehicle body 1A.

Figure 3:
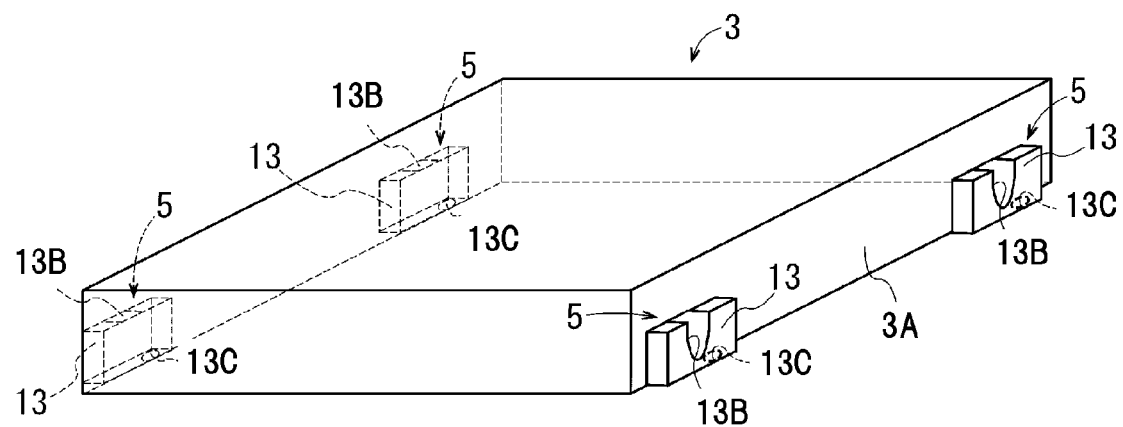
FIG. 3 is a perspective view of the battery unit and a mounting table including a plurality of locking apparatus according to a first preferred embodiment of the present invention, showing positional relation of the battery unit, the locking apparatus each including a locking apparatus body, a pin and the mounting table.
Figure 3:
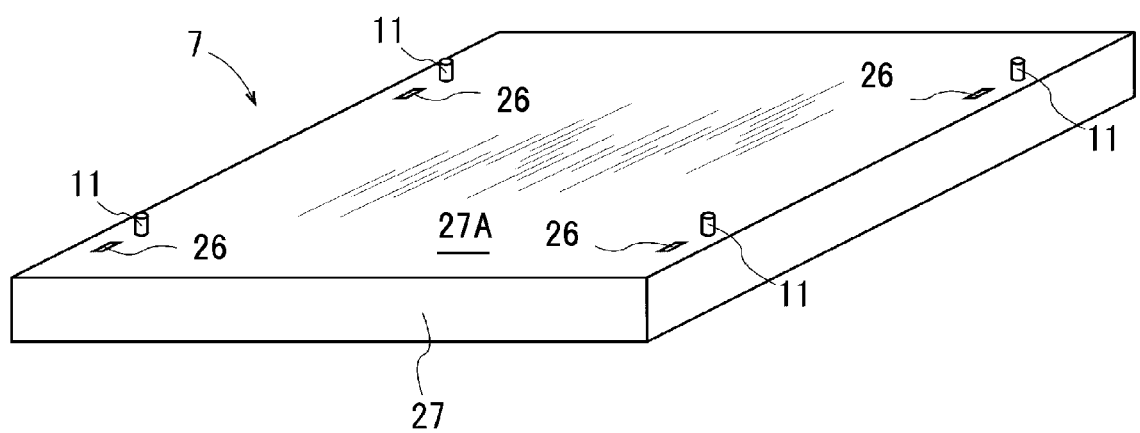
Figure 4:
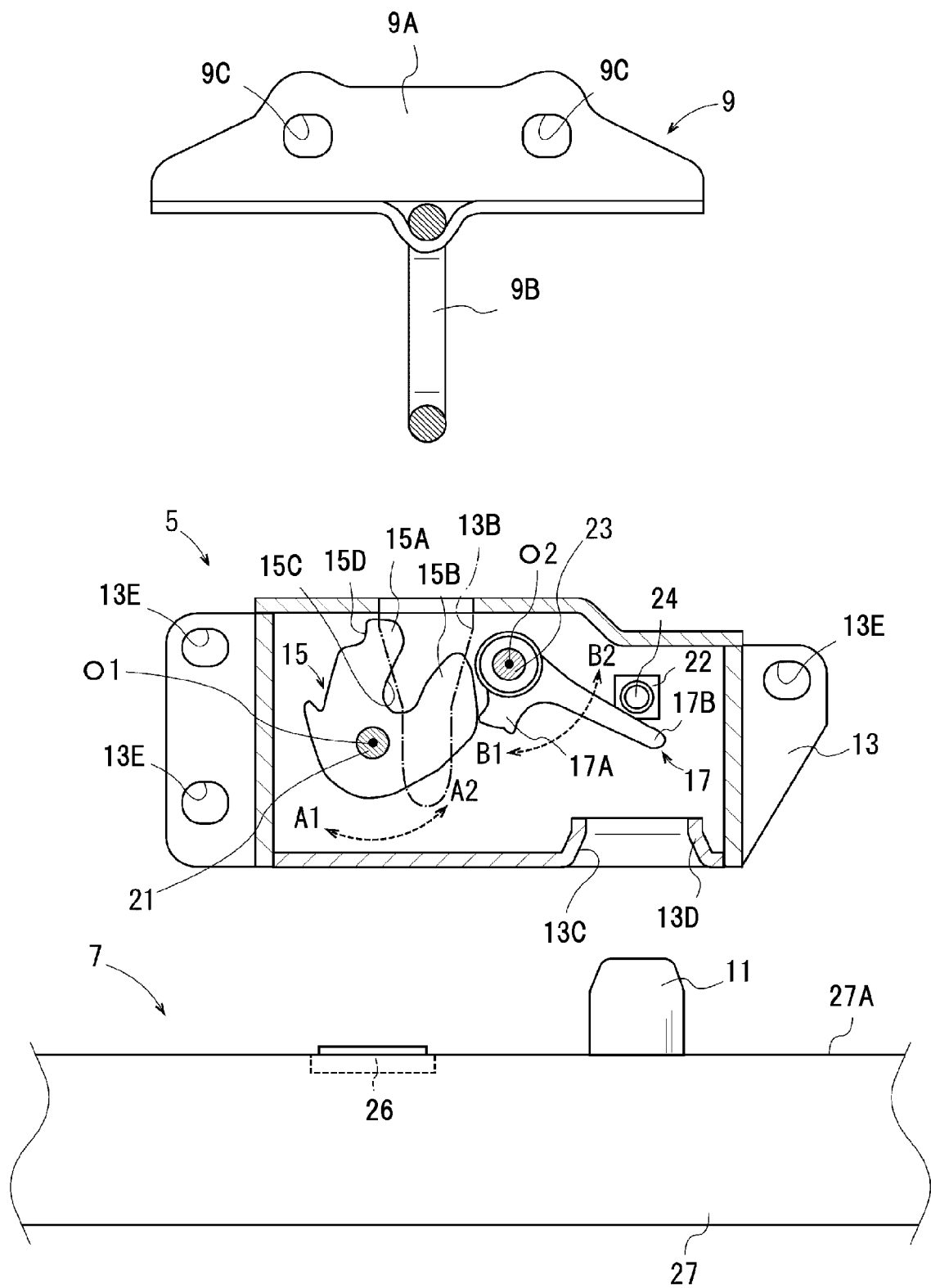
FIG. 4 is a cross-sectional view of the locking apparatus of FIG. 3, showing a striker, the locking apparatus body and the mounting table.

The following will describe a first preferred embodiment of the present invention with reference to FIGS. 3 through 11. Referring to FIGS. 3 and 4, each locking apparatus of the first preferred embodiment includes a striker 9, a locking apparatus body 5, and a mounting device 7. The mounting device 7 includes a mounting table 27. Pin devices 11 and limit switches 26 are mounted to a surface 27A of the mounting table 27. Each limit switch 26 serves as a detection member of the present invention.

The electric vehicle 1 and the station 10 of the first preferred embodiment of the present invention use four locking apparatus each includes one striker 9, one locking apparatus body 5, one pin device 11 and one limit switch 26. Each striker 9 is mounted to the vehicle body 1A and each locking apparatus body 5 is mounted to the battery unit 3.

Referring to FIG. 4, the striker 9 includes a base plate 9A joined to the flame 1C shown in FIG. 1 and a striker shaft 9B joined to the base plate 9A. The base plate 9A has a plurality of holes 9C for receiving therethrough bolts for joining the base plate 9A to the flame 1C. The striker shaft 9B is formed by bending a metal plate into a U-shape. The base plate 9A and the striker shaft 9B are integrally joined to each other by welding.

Two strikers 9 are mounted to one flame 1C and another two strikers 9 are mounted to the other flame 1C through bolts (not shown) at positions in the space 1B. The two pairs of the four strikers 9 each including a striker shaft 9B, which will be described later, are arranged in such a manner that one striker shaft 9B of one pair faces one striker shaft 9B of the other pair and the other striker 9 of the one pair faces the other striker 9 of the other pair. Any desired number of strikers such as 9 may be mounted to the flame 1C depending on the size of the battery unit 3. It is noted that in FIGS. 1 and 2, only one flame 1C is shown and the other flame 1C and the strikers 9 mounted to the other flame 1C are not shown.

As shown in FIG. 3, the battery unit 3 includes a case 3A having a rectangular box shape and a plurality of batteries (not shown) stored in the case 3A. A connecting terminal (not shown) is provided in the case 3A for electrically connecting the batteries to the vehicle body 1A. The shape of the case 3A may be modified depending on the shape of the space 1B of the vehicle body 1A shown in FIG. 1.

Referring to FIG. 3, two locking apparatus bodies 5 of each pair are mounted to the surface of each long side of the rectangular-shaped case 3A so as to correspond to the strikers 9, respectively. As shown in FIG. 4, the locking apparatus body 5 includes a housing 13, a latch 15, a pawl 17 and a first solenoid 22. A locking pin 24 is fixed to the first solenoid 22. The locking pin 24 serves as a pawl locking member of the present invention.

The housing 13 is fixed to the case 3A of the battery unit 3, as shown in FIG. 3. The housing 13 includes a recess 13B opened in the top surface thereof and extending vertically for receiving therethrough the striker shaft 9B, as shown in FIG. 4, and a hole 13C that is opened in the bottom surface of the housing 13 and extending vertically for receiving therethrough the pin device 11. The housing 13 further includes a guide portion 13D formed around the hole 13C by bending a part of the housing 13 for guiding the pin device 11 and three holes 13E for receiving therethrough bolts (not shown) for joining the housing 13 to the case 3A.

Referring to FIG. 4, a first rocking shaft 21 and a second rocking shaft 23 for the latch 15 and the pawl 17 are disposed in the housing 13 so as to extend horizontally from the housing 13, respectively. The first and the second rocking shafts 21, 23 have a first axis O1 and a second axis O2, respectively.

A recess 15C having a substantially U-shape is formed in the latch 15. The latch 15 includes an upper latch portion 15A located above the recess 15C and a lower latch portion 15B below the recess 15C, as shown in FIG. 4. The striker shaft 9B entering into the recess 13B of the housing 13 is received in the recess 15C of the latch 15. The latch 15 is formed with a locking surface 15D adjacent to the upper latch portion 15A.

The latch 15 is rotatably supported by the first rocking shaft 21 to be rotatable in directions A1, A2 indicated by double-headed dashed arrow in FIG. 4. The latch 15 is urged by a coil spring (not shown) in the direction A2 from the locking position to the releasing position, or in the counterclockwise direction as seen in FIG. 4, around the first rocking shaft 21. In the locking position to which the latch 15 is swung in the direction A1 against the urging force of the spring, the striker shaft 9B is locked by the latch 15 in the recess 13B. The striker shaft 9B is released from the latch 15 in the recess 13B when the latch 15 is swung in the direction A2. Thus, the latch 15 is rotatable around the first axis O1 between the locking position and the releasing position or locking state and releasing state.

The pawl 17 is formed in an L-shape having a locking arm 17A and an operating arm 17B which extends radially outward from the locking arm 17A. The pawl 17 is rotatably supported by the second rocking shaft 23 to be rotatable in directions B1, B2 indicated by double-headed dashed arrow in FIG. 4. The pawl 17 is urged by a coil spring (not shown) in the direction B1, or in the clockwise direction as seen in FIG. 4, around the second rocking shaft 23. When the pawl 17 is rotated in the direction B1, the locking arm 17A of the pawl 17 is moved to the first position in which the latch 15 is locked by the locking arm 17A of the pawl 17. When the pawl 17 is rotated in the direction B2, the locking arm 17A is moved to the second position in which the latch 15 is released from the locking arm 17A. Thus, the locking arm 17A is movable between the first position and the second position by rotating the pawl 17 around the second axis O2.

The first solenoid 22 is electrically connected to a control device 7A which will be described later. The first solenoid 22 is movable by the control device 7A between extending state in which the locking pin 24 is horizontally extended in the housing 13 and a receiving state in which the locking pin 24 is received in the first solenoid 22. The rest of the structure of the first solenoid 22 is similar to a known solenoid and, therefore, the description thereof will be omitted.

As shown in FIG. 1, the mounting device 7 includes a base 33 fixed on the lower floor 10B, the mounting table 27 and an elevating mechanism 36 disposed between the base 33 and the mounting table 27. The control device 7A is disposed adjacent to the mounting device 7.

The elevating mechanism 36 includes a lower support member 31 and a first link member 35, a second link member 37 and an upper support member 29. The lower support member 31 is fixed to the base 33. The lower support member 31 is formed with a pair of elongated holes 31A extending horizontally. The upper support member 29 is also formed with a pair of elongated holes 29A extending horizontally. The first and the second link members 35, 37 are of substantially the same dimension and pivotally connected to each other through a pin 39 at the respective centers thereof. The lower end of the first link member 35 is slidably connected to the lower support member 31 by a connecting shaft 41B. The lower end of the second link member 37 is slidably connected to the lower support member 31 by a connecting shaft 41D provided at the lower end of the second link member 37 and disposed in the elongated hole 31A. The upper end of the second link member 37 is slidably connected to the upper support member 29 by a connecting shaft 41C. The upper end of the first link member 35 is slidably connected to the upper support member 29 by a connecting shaft 41A provided at the upper end of the first link member 35 and disposed in the elongated hole 29A. The mounting table 27 is fixed to the upper support member 29.

A motor (not shown) and gears (not shown) for transmitting power of the motor to the connecting shaft 41D are disposed in the base 33. The motor is electrically connected to the control device 7A. Alternatively, an electrically operated linear cylinder or a hydraulic cylinder may be used instead of the motor.

As shown in FIG. 3, each limit switch 26 is disposed on the surface 27A of the mounting table 27 to be contactable with the housing 13. Each limit switch 26 is electrically connected to the control device 7A show in FIG. 1. When the housing 13 pushes the limit switch 26, the limit switch 26 detects a contact between the battery unit 3 and the mounting table 27 and generating a detection signal. Instead of the limit switch 26, a pressure sensor which operable to detect a pressure of the battery unit 3 located above the mounting table 27.

As shown in FIG. 3, each pin device 11 is fixed to the mounting table 27 at such position that the pin device 11 can be into its corresponding hole 13C formed in the locking apparatus body 5 fixedly mounted to the case 3A of the battery unit 3.

Figure 5A:
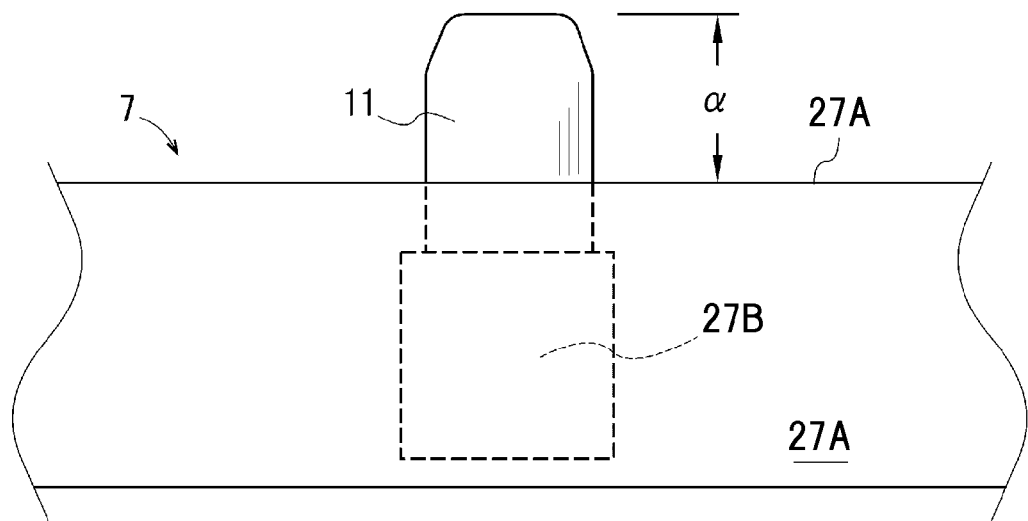
FIG. 5A is a partially enlarged cross-sectional view of the pin of the locking apparatus of FIG. 3, showing a state where the pin is extended from the mounting table to a first length α.
Figure 5B:
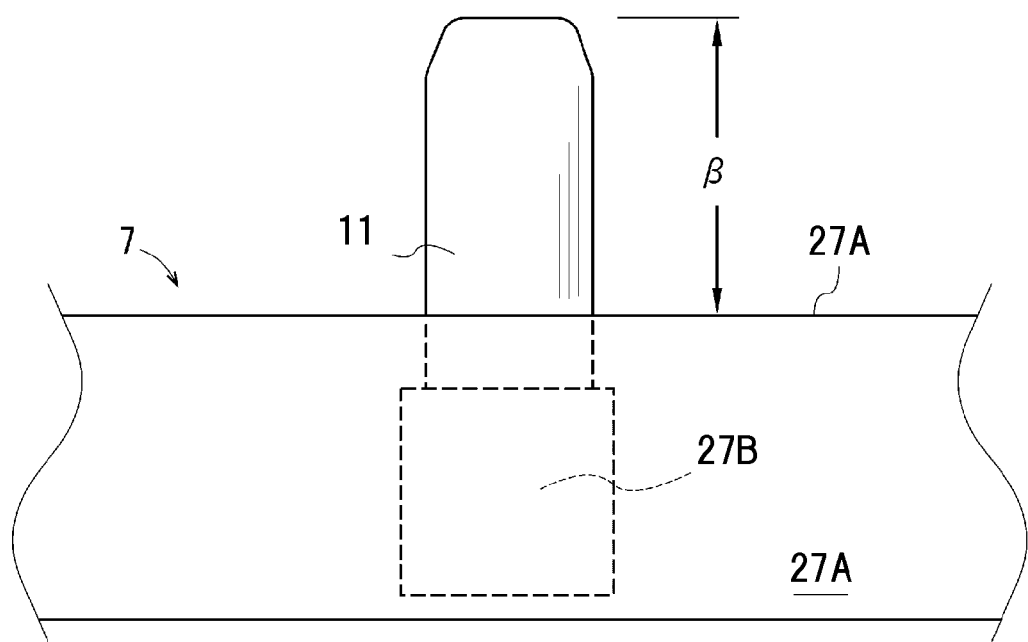
FIG. 5B is a partially enlarged cross-sectional view of the pin of the locking apparatus of FIG. 3, showing a state where the pin is extended from the mounting table to a second length β.

Referring to FIGS. 5A, 5B, each pin device 11 extends out vertically from the surface 27A of the mounting table 27. Second solenoids 27B are disposed in the mounting table 27 and each pin device 11 is connected to the corresponding second solenoid 27B. Each second solenoid 27B is electrically connected to the control device 7A shown in FIG. 1.

When the battery unit 3 is removed from the vehicle body 1A and the limit switch 26 generates the detection signal, the second solenoid 27B is driven to control the pin device 11 so as to extend to a first length α from the mounting table shown in FIG. 5A or a second length β from the mounting table shown in FIG. 5B. The second solenoid 27B serves as a pin device control mechanism of the present invention. Instead of the second solenoid 27B, an electrically operated linear cylinder or a hydraulic cylinder may be used as the pin device control mechanism.

In the state that each pin device 11 is extended to the first length α shown in FIG. 5A and inserted into its corresponding hole 13C shown in FIG. 4, the battery unit 3 may be set on the mounting table 27 of the mounting device 7. In the state that the each pin device 11 is extended to the second length β and brought into contact with the pawl 17 thereby to rotate the pawl 17 in the direction B2, or move the locking arm 17A from the first position to the second position. Each pin device 11 and each second solenoid 27B cooperate to serve as an unlocking member of the present invention.

According to the locking apparatus as constructed above, the battery unit 3 is fixedly mounted to and removed from the vehicle body 1A as explained below.

The following will describe a procedure for mounting the battery unit 3 to the vehicle body 1A. As shown in FIG. 1, the electric vehicle 1 is disposed at a predetermined position on the upper floor 10A of the station 10. For this purpose, position of the electric vehicle 1 may be adjusted such that the space 1B is located just above the opening 10C or the mounting device 7. As shown in FIG. 1, the electric vehicle 1 has no battery unit such as the battery unit 3 in the space 1B of the electric vehicle 1.

Figure 6:
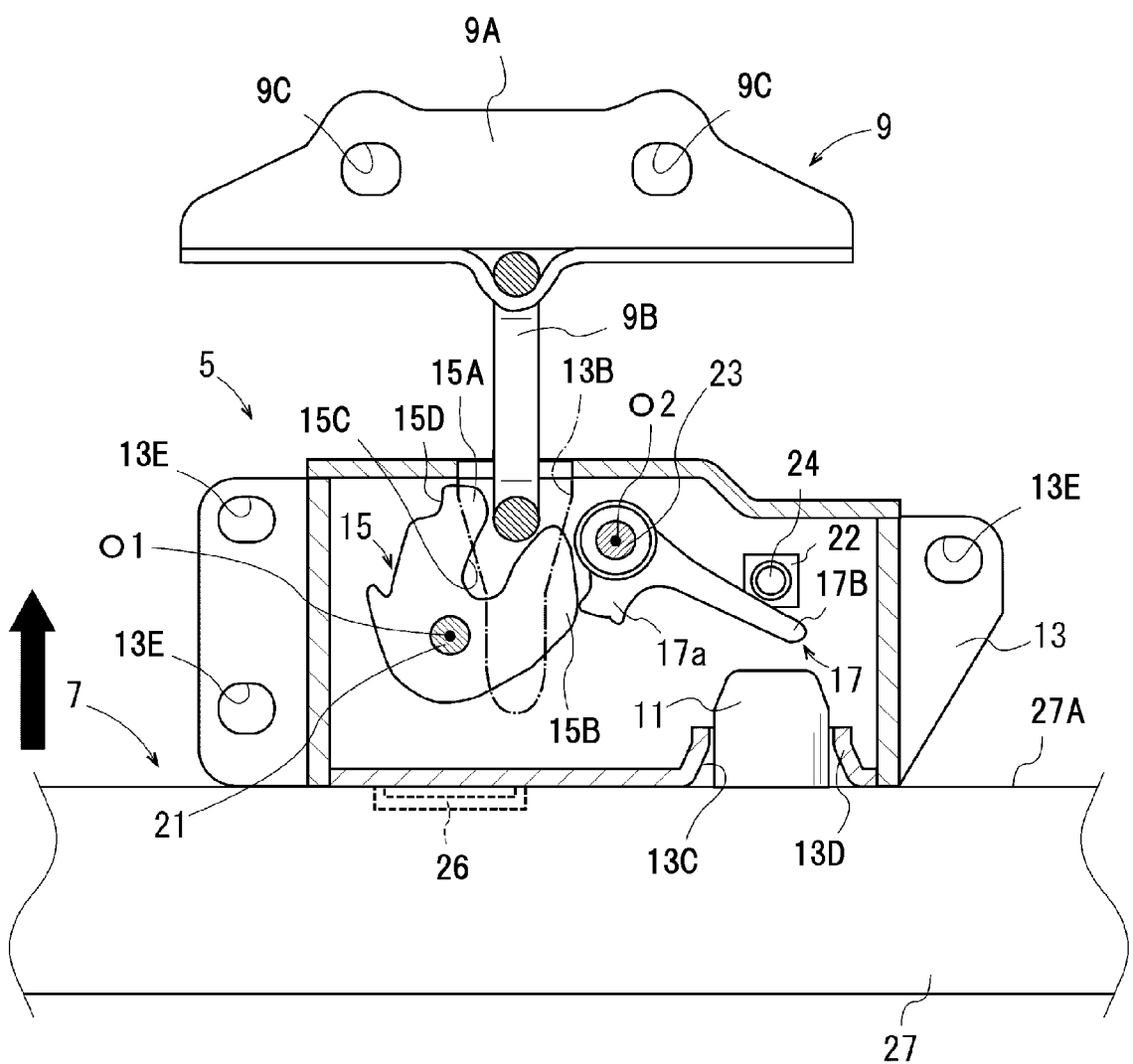
FIG. 6 is a cross-sectional view of the locking apparatus of FIG. 3, showing a state of the striker, the locking apparatus body and the mounting table while the battery unit is being moved upward.

The battery unit 3 is set on the mounting table 27 of the mounting device 7. Each pin device 11 is extended to the first length α. In this state, the battery unit 3 is disposed such that each pin device 11 is inserted in the hole 13C through the guide portion 13D, thereby setting the battery unit 3 correctly on the mounting table 27, as shown in FIG. 6. Each locking pin 24 is received in the corresponding first solenoid 22, thereby releasing the pawl 17.

In this state of the locking apparatus body 5, the mounting table 27 is moved upward in the direction indicated by the solid arrow in FIG. 6 to a position where the battery unit 3 is located adjacent to the space 1B, and the striker shaft 9B enters into the recess 13B.

Figure 7:
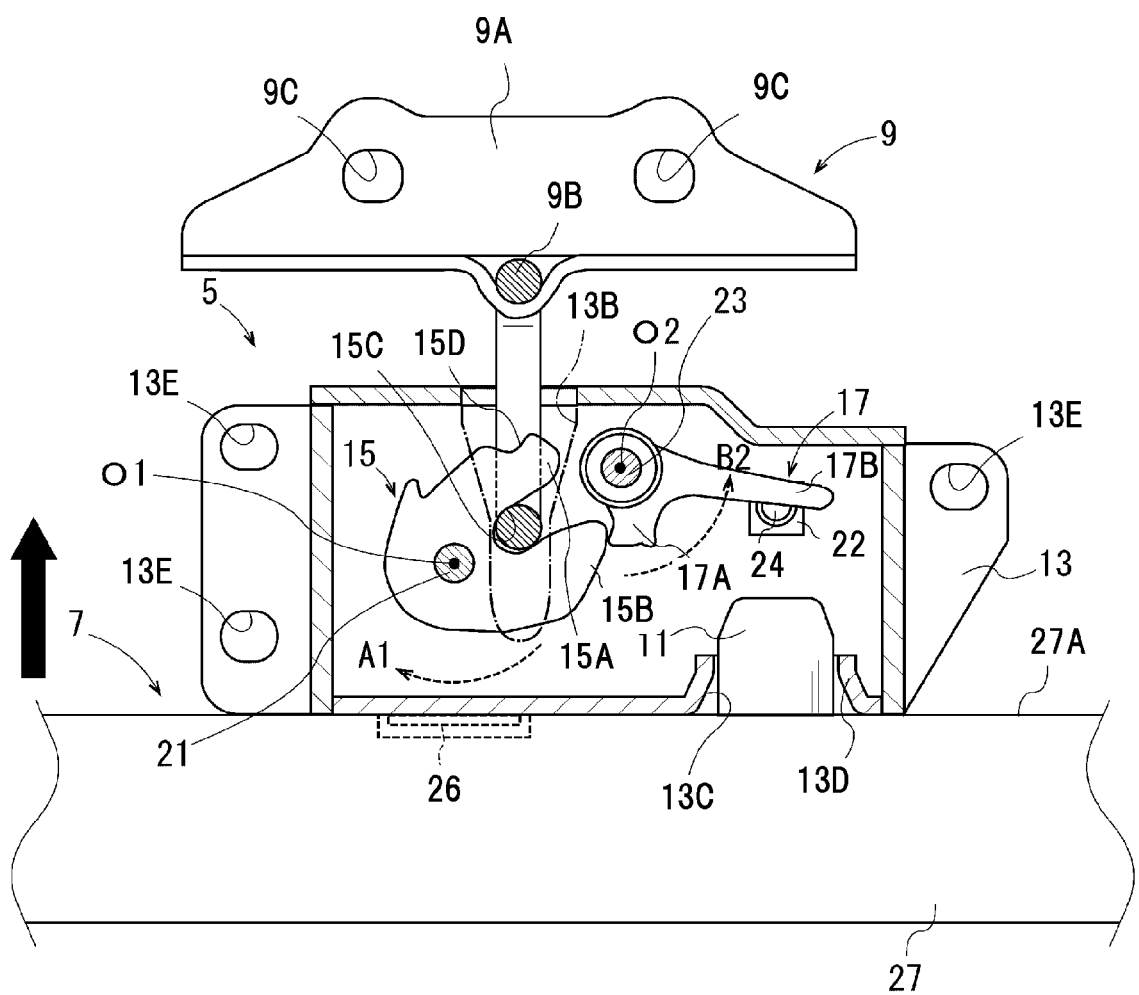
FIG. 7 is a cross-sectional view of the locking apparatus of FIG. 3, showing a state of the striker, the locking apparatus body and the mounting table while the battery unit is being moved further upward.

Referring to FIG. 7, the lower latch portion 15B of the latch 15 is brought into contact with the striker shaft 9B, so that the latch 15 is pushed by the striker shaft 9B, and the latch 15 is rotated against the urging force of the coil spring in the direction A1 indicated by dashed arrow in FIG. 7. The locking arm 17A of the pawl 17 is pushed by the lower latch portion 15B of the latch 15, so that the pawl 17 is rotated against the urging force of the coil spring in the direction B2 indicated by the dashed arrow in FIG. 7, and the locking arm 17A is moved from the first position to the second position.

Figure 8:
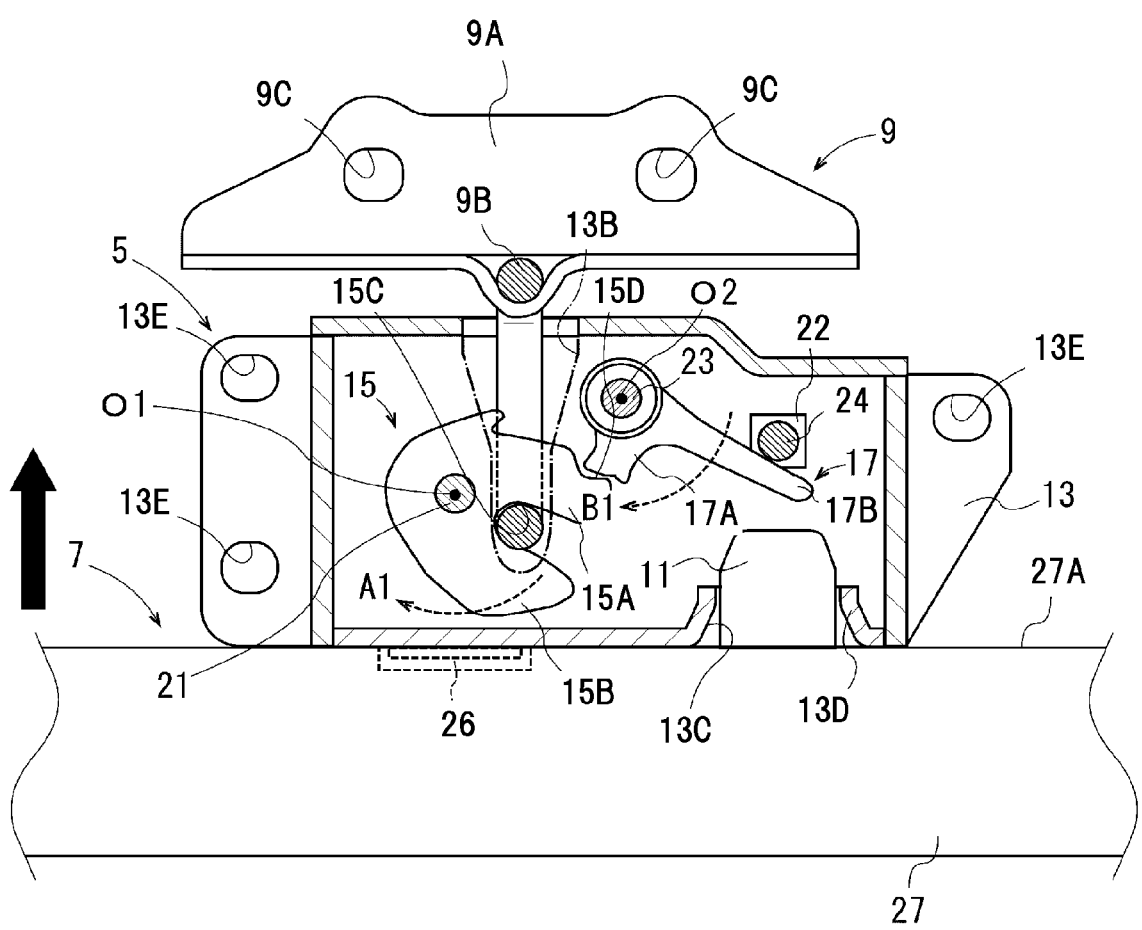
FIG. 8 is a cross-sectional view of the locking apparatus of FIG. 3, showing a state of the striker, the locking apparatus body and the mounting table when the battery unit is moved to the position of FIG. 2.

When the battery unit 3 is positioned in the space 1B as shown in FIG. 2, the pawl 17 is rotated by the urging force of the coil spring in the direction B1 indicated by dashed arrow in FIG. 8, and the locking arm 17A is moved from the second position to the first position. Thus, the locking arm 17A is engaged with the locking surface 15D of the latch 15. Therefore, the latch 15 is in the locking state where the latch 15 locks the striker shaft 9B in the recess 15C. Simultaneously, the electrical connection between the batteries in the battery unit 3 and the electric vehicle 1 is established.

In this state, the control device 7A controls the first solenoid 22 to extend the locking pin 24 in the housing 13. Thus, the locking pin 24 contacts with the operating arm 17B of the pawl 17, so that the rotation of the pawl 17 in the direction B2 is prevented by the locking pin 24 and the movement of the locking arm 17A to the second position is prevented by the locking pin 24. Therefore, the locking of the pawl 17 by the lever 19 is completed, and the locking of the latch 15 by the pawl 17 is also completed.

Figure 9:
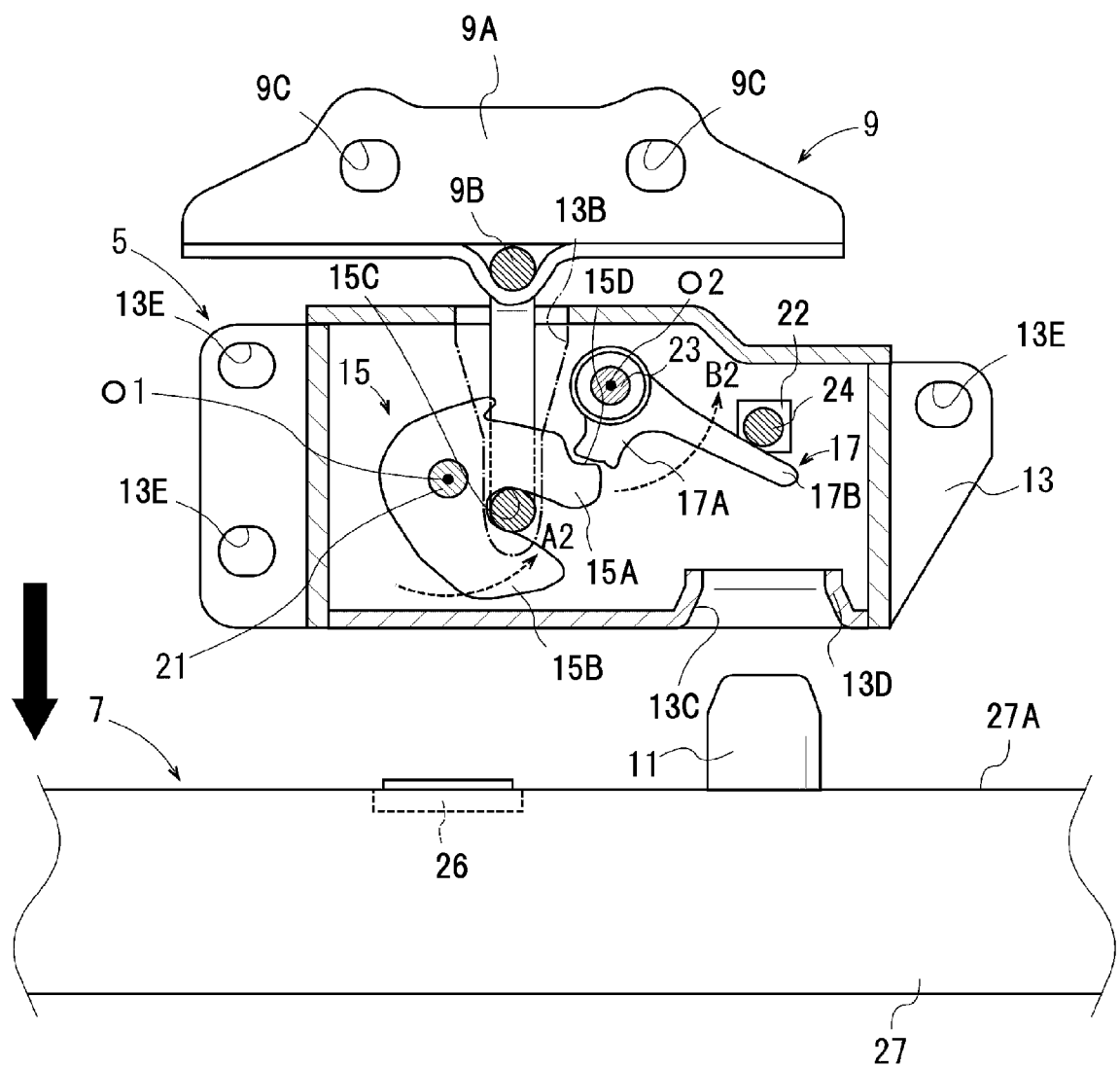
FIG. 9 is a cross-sectional view of the locking apparatus of FIG. 3, showing a state of the striker, the locking apparatus body and the mounting table when mounting of the battery unit to the vehicle body is completed.

Subsequently, the mounting table 27 is moved downward as indicated by solid arrow in FIG. 9, so that the pin device 11 is removed from the hole 13C and, therefore, locking of the striker shaft 9B by the locking apparatus body 5 is completed and the battery unit 3 is securely locked in the space 1B.

The following will describe a procedure for removing the battery unit 3 from the vehicle body 1A. As shown in FIG. 2, the electric vehicle 1 is set at the predetermined position on the upper floor 10A of the station 10. The position of the electric vehicle 1 is adjusted such that the space 1B in the vehicle body 1A is located just above the opening 10C or the mounting device 7. The battery unit 3 is set in place in the electric vehicle 1 at the space 1B.

No battery unit such as the battery unit 3 is placed on the mounting table 27 of the mounting device 7. Each pin device 11 is extened to the first length α.

Figure 10:
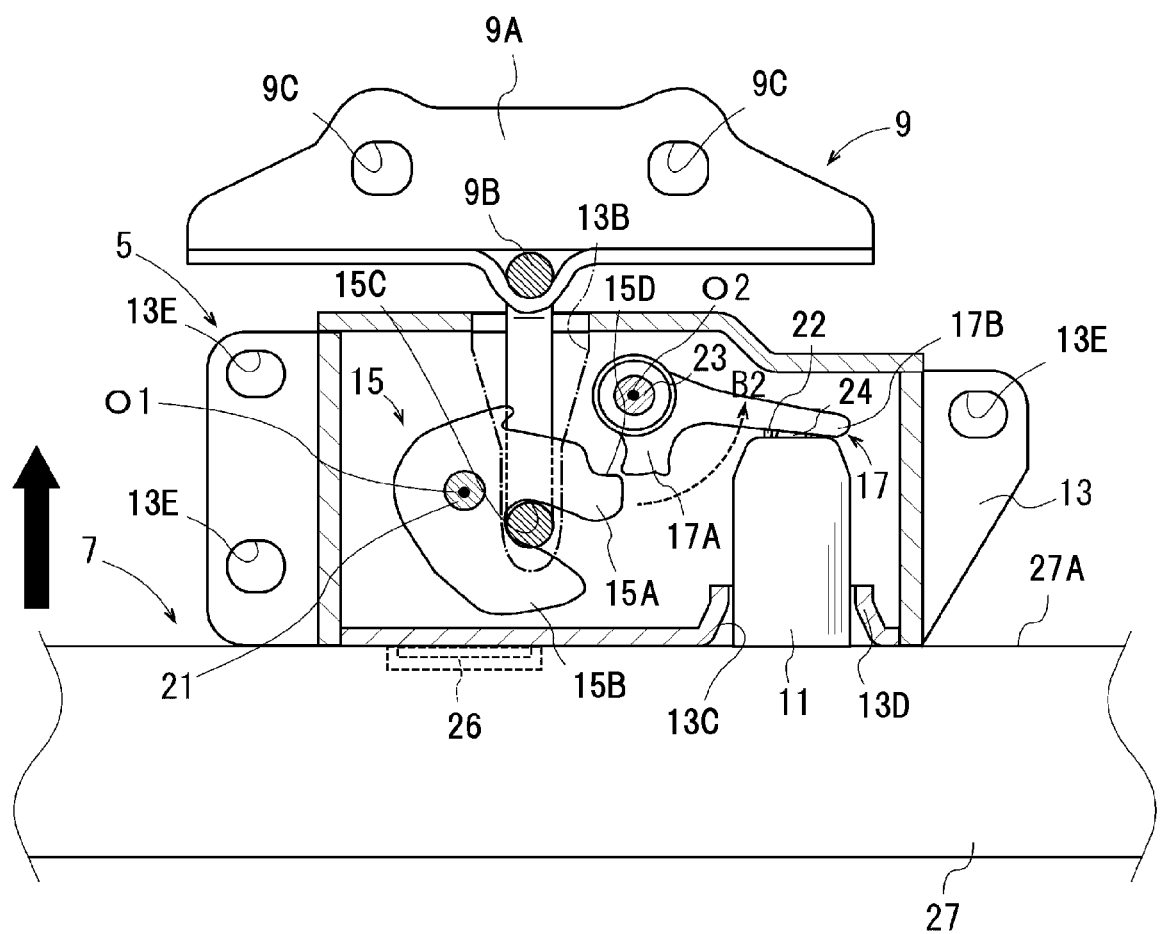
FIG. 10 is a cross-sectional view of the locking apparatus of FIG. 3, showing a state of the striker, the locking apparatus body and the mounting table while the battery unit is being removed from the vehicle body.

In this state, referring to FIG. 10, the mounting table 27 is moved upward through the control device 7A, so that each pin device 11 on the mounting table 27 is inserted into its corresponding hole 13C and the mounting table 27 is brought into contact with the battery unit 3 and the locking apparatus bodies 5. Since the pin device 11 is inserted into the hole 13C while being guided by the guide portion 13D, the mounting table 27 is positioned correctly with respect to the battery unit 3.

The battery unit 3 and the locking apparatus body 5 is brought into contact with the mounting table 27, so that the limit switches 26 are pushed to generate a detection signal. According to the detection signal, the first solenoid 22 is driven to control the locking pin 24 to be received in the first solenoid 22, thereby releasing the pawl 17 from the locking pin 24. Then, the second solenoid 27B is driven through the control device 7A to control the pin device 11 to extend to the second length β. The operating arm 17B of the pawl 17 is pushed by the pin device 11 extended to the second length β, so that the pawl 17 is rotated against the urging force of the coil spring in the direction B2 indicated by the dashed arrow in FIG. 10, and the locking arm 17A of the pawl 17 is moved from the first position to the second position. Thus, the locking surface 15D of the latch 15 is unlocked from the locking arm 17A of the pawl 17 and, therefore, locking of the latch 15 by the pawl 17 is released.

Figure 11:
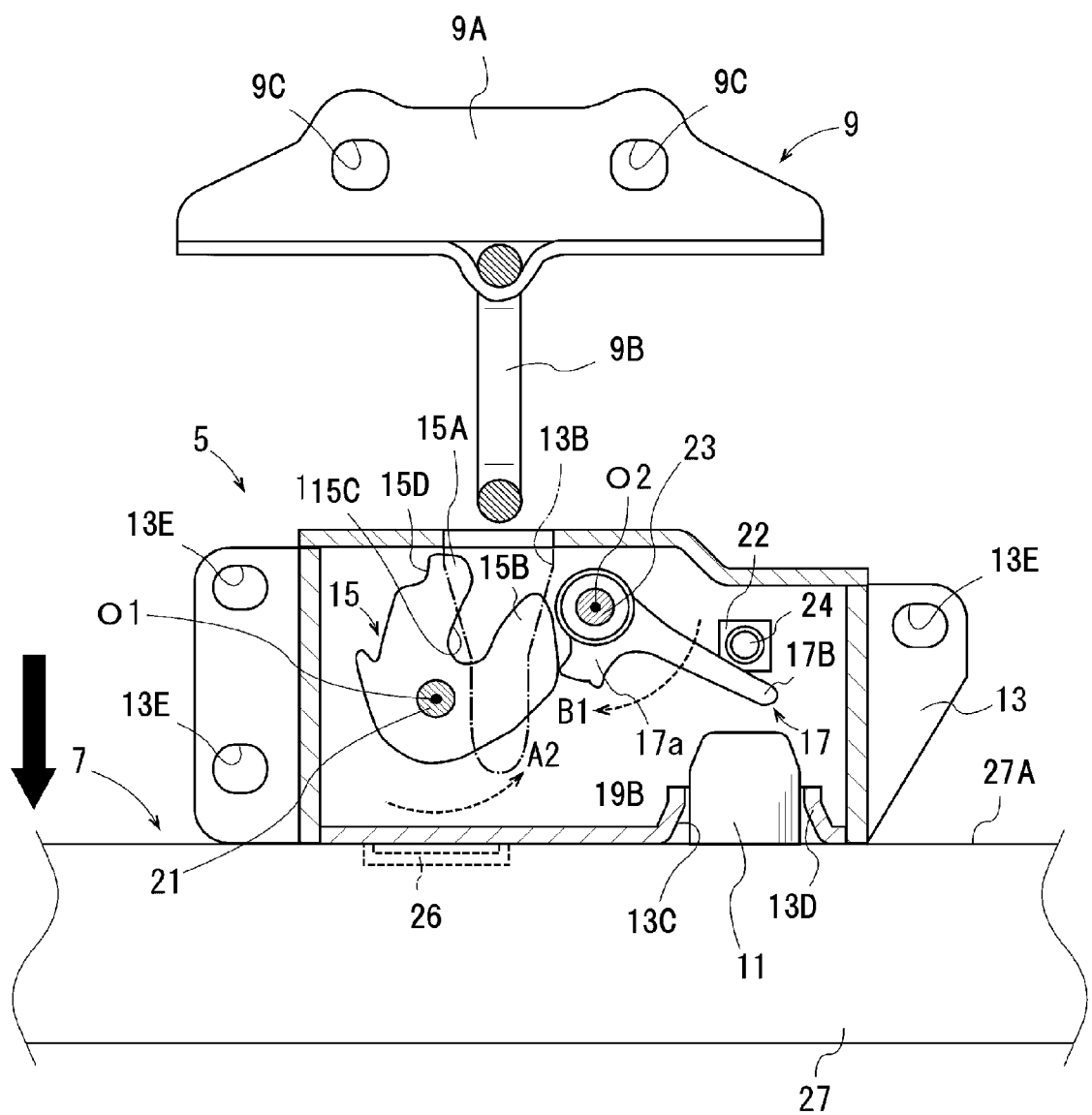
FIG. 11 is a cross-sectional view of the locking apparatus of FIG. 3, showing a state of the striker, the locking apparatus body and the mounting table while the battery unit is being moved downward.

Then, the mounting table 27 is moved downward thereby to lower the battery unit 3 from the space 1B in the direction indicated by solid arrow in FIG. 11, so that the upper latch portion 15A of the latch 15 is pushed by the striker shaft 9B to be rotated in the direction A2, and the latch 15 is placed in the releasing state. The striker shaft 9B is moved in the direction away from the recess 13B and released from the locking by the locking apparatus body 5, with the result that the removing of the battery unit 3 from the vehicle body 1A is completed. Simultaneously, the electrical connection between the batteries in the battery unit 3 and the electric vehicle 1 is broken.

After the removing of the battery unit 3 is completed, the second solenoid 27B is driven through the control device 7A and the pin device 11 is extended to the first length α, so that the operating arm 17B of the pawl 17 is released from contact engagement with the pin device 11. The pawl 17 is rotated in the direction B1 by the urging force of the coil spring, and the locking arm 17A of the pawl 17 is moved from the second position to the first position. The battery unit 3 removed from the vehicle body 1A is moved away from the mounting table 27. It is so controlled that the pin device 11 is extended from the length β to the length α before the battery unit 3 is moved away from the mounting table 27, so that the pin device 11 is prevented from being damaged.

According to the locking apparatus of the first preferred embodiment of the present invention, the battery unit 3 may be locked to the vehicle body 1A only by moving the battery unit 3 upward into the space 1B by the mounting device 7. Similarly, the battery unit 3 may be removed from the vehicle body 1A only by moving the battery unit 3 downward from the space 1B through the mounting device 7.

The locking apparatus includes the locking pin 24 which prevents the pawl 17 from rotating. Thus, the locking arm 17A of the pawl 17 is prevented from rotating from the first position to the second position by the locking pin 24. Therefore, according to the locking apparatus of the first preferred embodiment of the present invention, the latch 15 in the locking state is prevented from being rotated to the releasing state and, therefore, the battery unit 3 is locked to the vehicle body 1A desirably.

According to the locking apparatus of the first preferred embodiment of the present invention, the locking arm 17A of the pawl 17 is pushed by the pin device 11 to rotate from the first position to the second position, so that the latch 15 in the locking state is released from the locking arm 17A of the pawl 17. Thus, the latch 15 is rotated from the locking state to the releasing state and, therefore, the striker 9 is released from the latch 15. As described above, the battery unit 3 may be locked to and removed from the vehicle body 1A. The battery unit 3 may be removed from the vehicle body 1A only by moving the mounting device 7 or the mounting table 27 to the battery unit 3 in the space 1B.

According to the locking apparatus of the first preferred embodiment of the present invention, looking and removing of the battery unit 3 to and from the vehicle body 1A may be performed effectively.

The locking apparatus includes the locking apparatus body 5 which includes only the housing 13, the latch 15, the pawl 17, the first solenoid 22 and the locking pin 24 and thus has a simple structure and, therefore, the manufacturing cost may be reduced.

The locking apparatus includes the mounting device 7 used for moving the battery unit 3 upward into the space 1B and downward from the space 1B. Therefore, locking and removing of the battery unit 3 to and from the vehicle body 1A may be performed easily.

The mounting device 7 includes the mounting table 27 on which the battery unit 3 is set and the elevating mechanism 36 which elevates the mounting table 27. The housing 13 includes the hole 13C opened in the bottom surface of the housing 13 and extending vertically. The pin device 11 mounted to and extending upward from the mounting table 27 and the second solenoid 27B through which the pin device 11 extended to the length α or β cooperate to serve as the unlocking member of the present invention According to the locking apparatus of the first preferred embodiment of the present invention, the battery unit 3 may be easily moved upward into the space 1B by the mounting device 7. The battery unit 3 is easily positioned with respect to the mounting table 27 of the mounting device 7 by the pin device 11 extended to the first length α by the second solenoid 27B. As described above, the pawl 17 is rotated by the pin device 11 extended to the second length β by the second solenoid 27B. Thus, locking and removing of the battery unit 3 to and from the vehicle body 1A may be performed easily. The pin device 11 and the second solenoid 27B cooperate to serve the unlocking member of the present invention and thus the unlocking member may be simplified and, therefore, the manufacturing cost may be reduced.

According to the locking apparatus of the first preferred embodiment of the present invention, the striker 9 is mounted to the vehicle body 1A, and the locking apparatus body 5 is mounted to the battery unit 3. The structure of the vehicle body 1A is a simple and compact in the electric vehicle 1 and, also the structure of the space 1B is compact.

The limit switch 26 is disposed on the mounting table 27 for detecting a contact between the battery unit 3 and the mounting table 27 and generating a detection signal when removing the battery unit 3 from the vehicle body 1A. The locking apparatus includes the control device 7A for controlling the second solenoid 27B so as to extend the each pin device 11 from the first length α to the second length β based on the detection signal.

If the battery unit 3 does not contact with the mounting table 27 when removing the battery unit 3 from the vehicle body 1A, the pin device 11 does not function as the unlocking member, so that the striker shaft 9B is not released from the latch 15. Thus, the removed battery unit 3 may be prevented from being dropped inadvertently onto the mounting table 27. Therefore, locking and removing of the battery unit 3 to and from the vehicle body 1A may be performed easily.

The guide portion 13D is formed in the housing 13 around the hole 13C for guiding the pin device 11. Thus, the pin device 11 is inserted through the hole 13C easily. Therefore, when locking and removing the battery unit 3 to and from the vehicle body 1A, the battery unit 3 is positioned on the mounting table 27 with respect to the mounting table 27 easily and, therefore, locking and removing of the battery unit 3 is performed easily.

Figure 12:
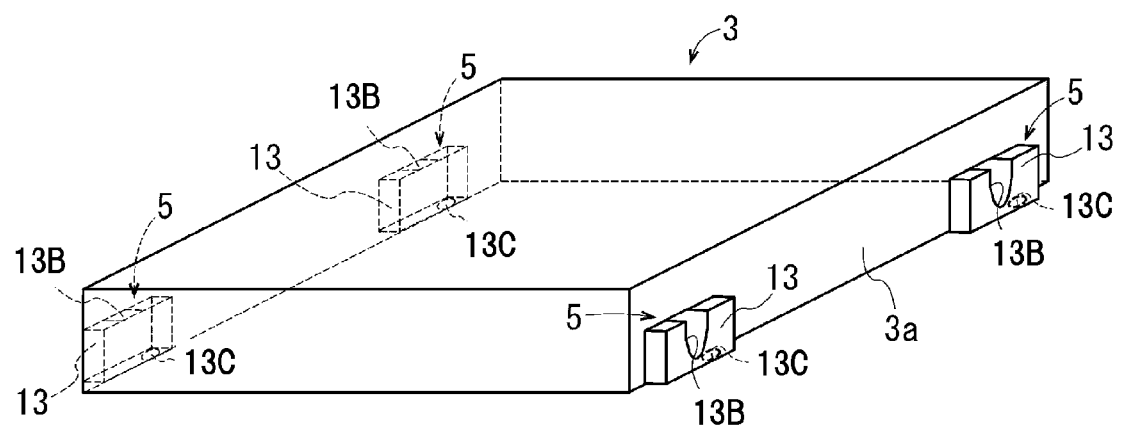
FIG. 12 is a perspective view of the battery unit and a mounting table including a plurality of locking apparatus according to a second preferred embodiment of the present invention, showing positional relation of the battery unit, the locking apparatus each including a locking apparatus body, a pin and the mounting table.
Figure 12:
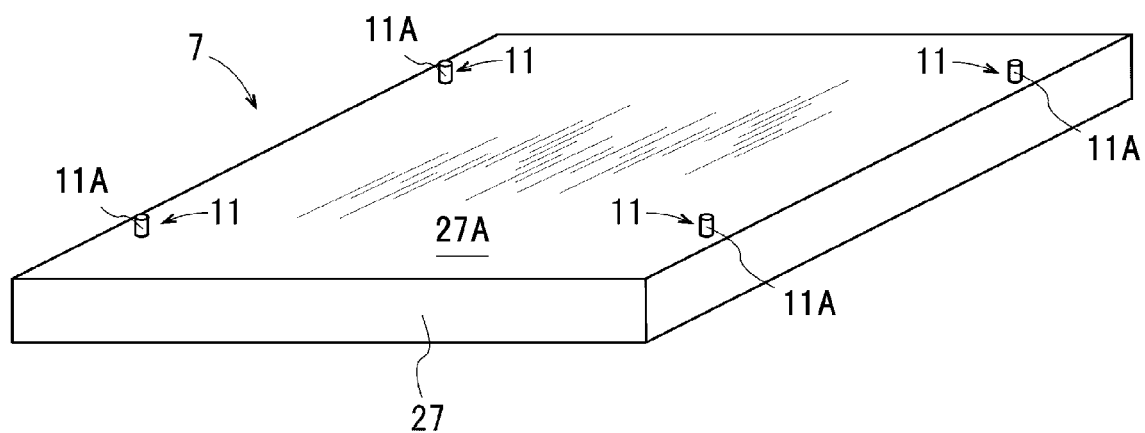
Figure 13:
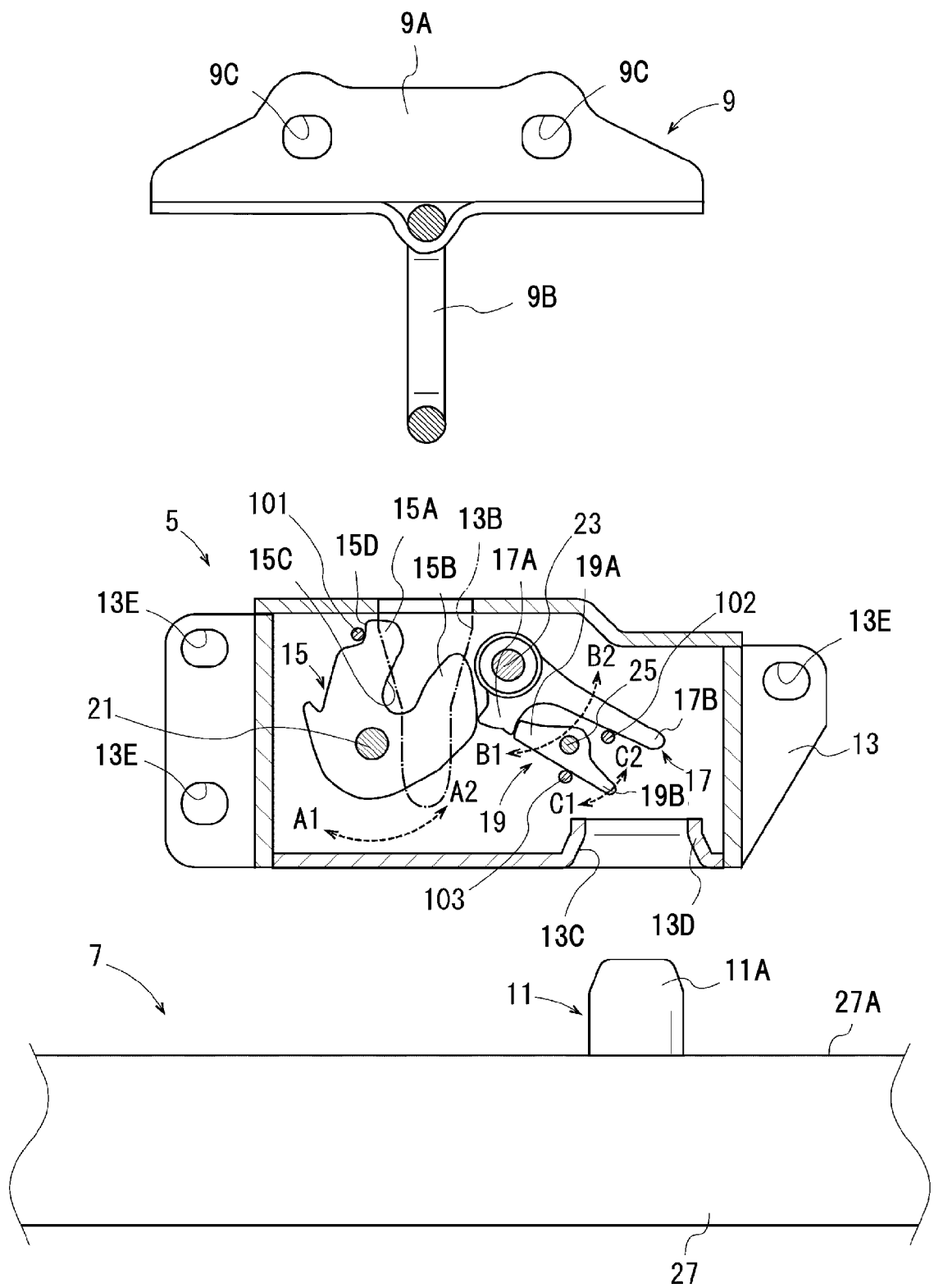
FIG. 13 is a cross-sectional view of the locking apparatus of FIG. 12, showing a striker, the locking apparatus body and the mounting table.
Figure 14:
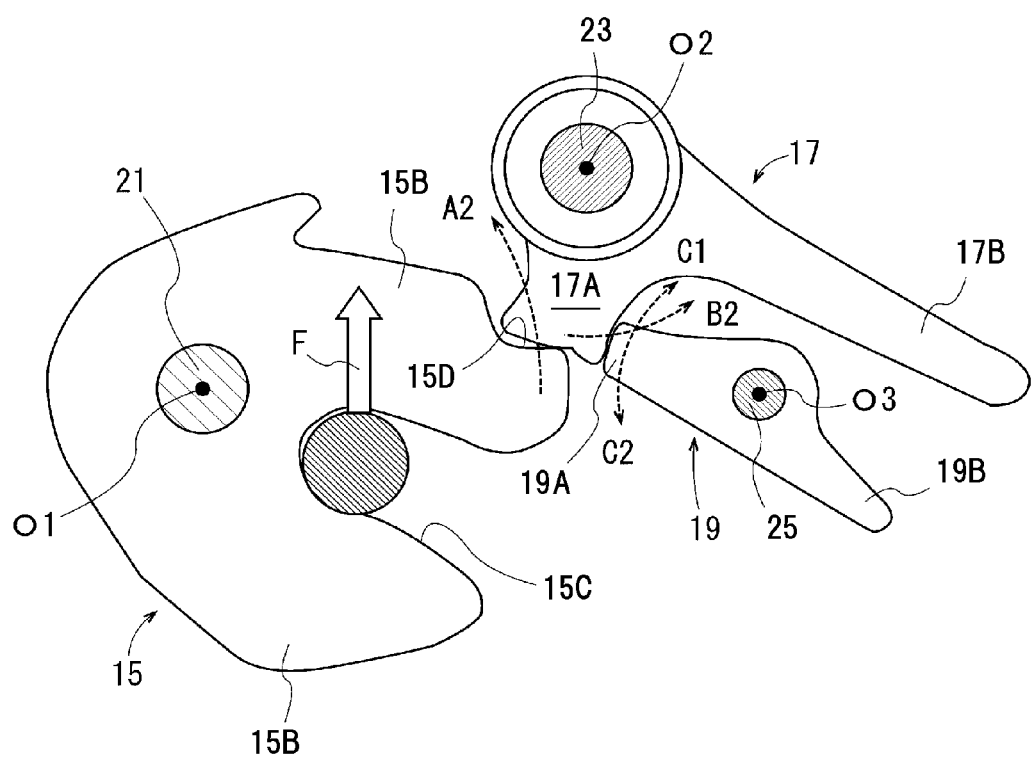
FIG. 14 is a partially enlarged cross-sectional view of the locking apparatus body of FIG. 12.

The following will describe a locking apparatus according to a second preferred embodiment of the present invention with reference to FIGS. 12 through 21. Referring to FIGS. 12, 13, the second preferred embodiment differs from the first preferred embodiment in that a lever 19 is disposed in the housing 13, first, second and third anti-rotation pins 101, 102, 103 and a third rocking shaft 25 for the lever 19 are fixed to the housing 13, and the locking apparatus dispenses with the locking pin 24, the first and the second solenoids 22, 27B and the limit switch 26. The lever 19 serves as the pawl locking member of the present invention. The each pin device 11 serves as the unlocking member of the present invention. Each of the first, second and third anti-rotation pins 101, 102, 103 serves as the anti-rotation member of the present invention. For the sake of convenience, illustration of the first, second and third anti-rotation pins 101, 102, 103 is omitted in FIGS. 14 through 23. Referring to FIG. 14, the third rocking shaft 25 for the lever 19 is disposed in the housing 13 so as to extend horizontally from the housing 13. The third rocking shaft 25 has a third axis O3.

The latch 15 in the releasing position is in contact with the first anti-rotation pin 101 so that the latch 15 is prevented from rotating further in the direction A2. When the pawl 17 urged in the direction B1 by the coil spring is brought into contact with the second anti-rotation pin 102, and the pawl 17 is prevented from rotating further the first position in the direction B1.

The lever 19 includes a locking arm 19A formed at one end of the lever 19 and an operating arm 19B formed at the other end. The lever 19 is rotatably supported by the third rocking shaft 25 to rotate in directions C1, C2 indicated by double-headed dashed arrow in FIG. 13. The lever 19 is urged by a coil spring (not shown) in the direction C1, or the clockwise direction as viewed in FIG. 13, around the third rocking shaft 25. Rotating the lever 19 in the direction C1, the operating arm 19B is moved to the third position in which the pawl 17 is prevented from rotating or locked by the locking arm 19A. Rotating the lever 19 in the direction C2, the locking arm 19A is moved to the fourth position in which the pawl 17 is released from the locking arm 19A. Thus, the position of the locking arm 19A of the lever 19 is movable between the third position and the fourth position by rotating the lever 19 around the third axis O3. The lever 19 urged in the direction C1 is brought into contact with the third anti-rotation pin 103, so that the locking arm 19A of the lever 19 is prevented from rotating further than the third position in the direction C1.

The rotating direction of the locking arm 17A of the pawl 17 from the first position to the second position corresponds to the rotating direction of the locking arm 19A of the lever 19 from the third position to the fourth position. In other words, the rotating direction of the pawl 17 in the direction B2 serving as a first rotating direction of the present invention and the rotating direction of the lever 19 in the direction C2 serving as a second rotating direction of the present invention are the same with respect to the respective second and the third axes O2, O3.

As shown in FIG. 14, any upward force F generated by load of the battery unit 3 and applied to the striker shaft 9B upward acts on the latch 15 to be rotated in the direction A2 indicated by single-headed dashed arrow in FIG. 14. If the latch 15 is released to rotate in the direction A2, the pawl 17 needs to be rotated in the direction B2 which is substantially perpendicular to the direction A2, and the locking arm 17A is rotated in the direction from the first position to the second position. If the pawl 17 is released from the lever 19 thereby to rotate in the direction B2, the lever 19 needs to be rotated in the direction C2 that is substantially the same as the direction B2.

In other words, rotating the lever 19 in the direction C1 that is substantially opposite to the direction B2, the lever 19 is kept at the third position in which the locking arm 19A of the lever 19 prevents the pawl 17 from rotating. Thus, when the locking arm 19A of the lever 19 is located at the third position, the locking arm 17A starts to rotate from the first position to the second position, but the locking arm 19A of the lever 19 is kept at the third position.

Figure 15A:
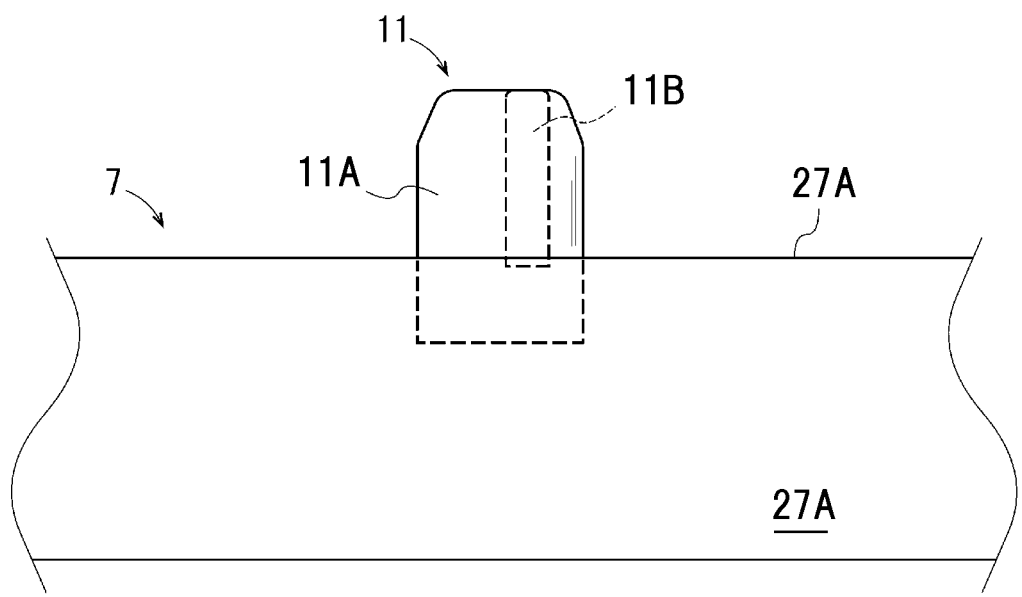
FIG. 15A is a partially enlarged cross-sectional view of a first pin portion and a second pin portion of the pin of the locking apparatus of FIG. 12, showing a state where the second pin portion is received in the first pin portion.
Figure 15B:
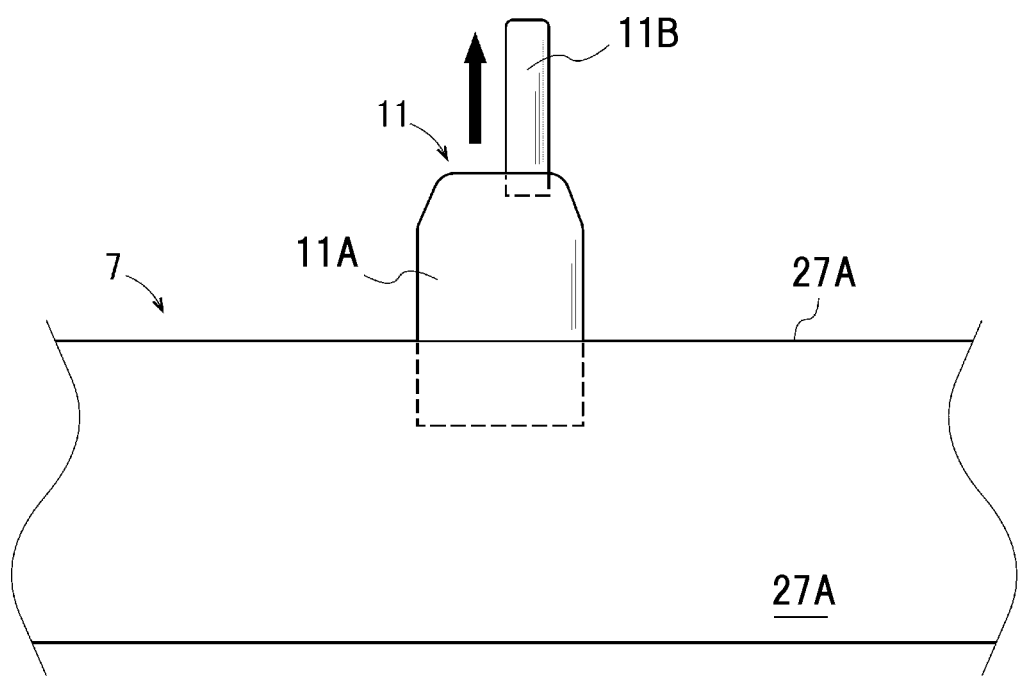
FIG. 15B is a partially enlarged cross-sectional view similar to FIG. 15A, but showing a state where the second pin portion is extended out from the first pin portion.

Referring to FIG. 15, each pin device 11 includes a first stationary pin member 11A extending out vertically from the surface 27A of the mounting table 27 and a second movable pin member 11B slidably received in the first stationary pin member 11A. The first and the second pin members 11A, 11B both extend upwardly.

The second pin member 11B is extendable out from the first pin member 11A. The lever 19 and the pawl 17 are disposed such that the first pin member 11A contacts with the operating arm 19B of the lever 19 thereby to rotate the lever 19 in the direction C2 and, then, the second pin member 11B extending out of the first pin member 11A contacts with the operating arm 17B of the pawl 17. After the locking arm 19A of the lever 19 is rotated from the third position to the fourth position, the locking arm 17A of the pawl 17 is rotated from the first position to the second position.

According to the locking apparatus as constructed above, the battery unit 3 is fixedly mounted to and removed from the vehicle body 1A as explained below.

The following will describe a procedure for mounting the battery unit 3 to the vehicle body 1A. As shown in FIG. 1, the electric vehicle 1 is disposed at a predetermined position on the upper floor 10A of the station 10. For this purpose, position of the electric vehicle 1 may be adjusted such that the space 1B is located just above the opening 10C or the mounting device 7. As shown in FIG. 1, the electric vehicle 1 has no battery unit such as the battery unit 3 in the space 1B of the electric vehicle 1.

Figure 16:
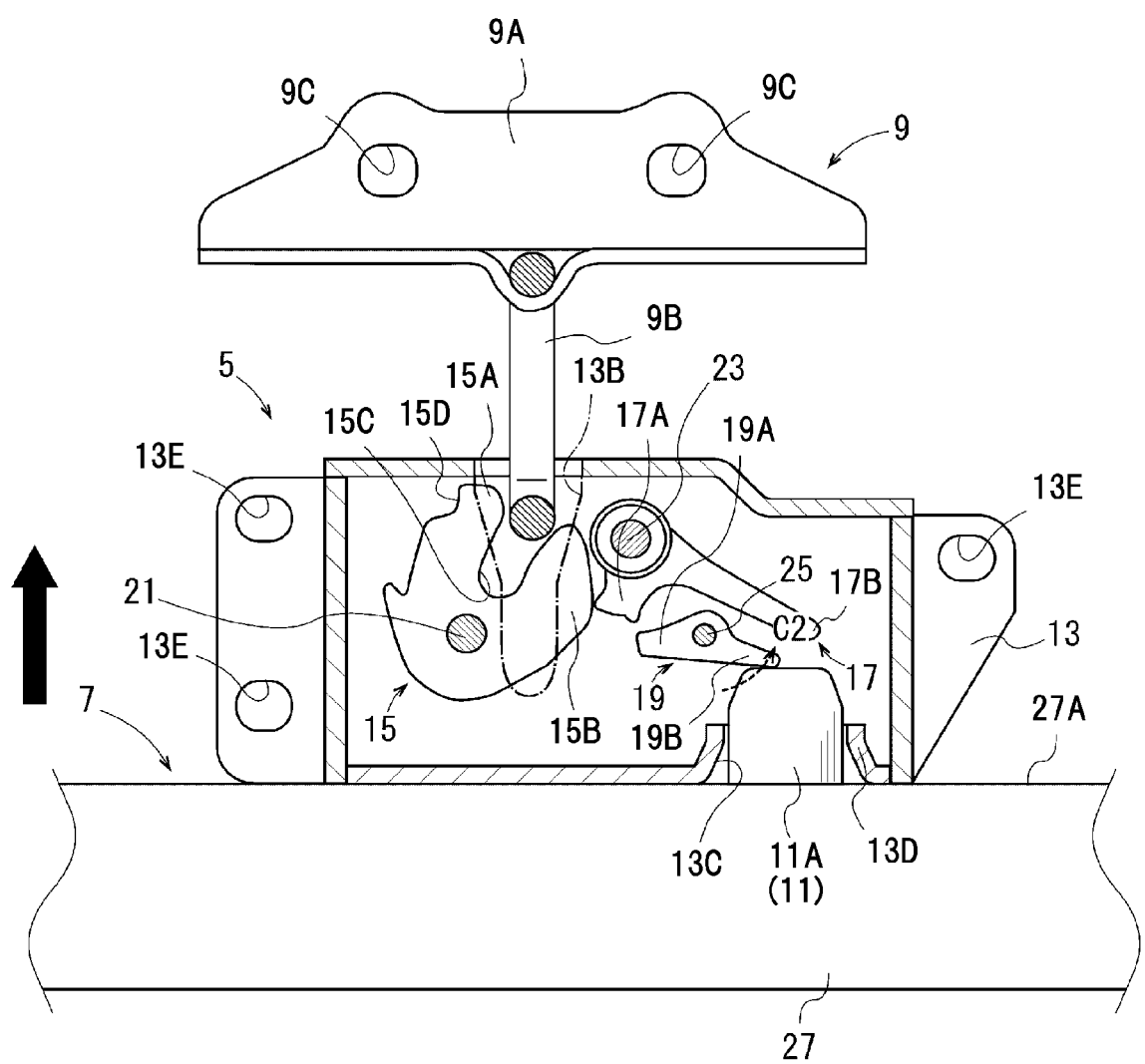
FIG. 16 is a cross-sectional view of the locking apparatus of FIG. 12, showing a state of the striker, the locking apparatus body and the mounting table while the battery unit is being moved upward.

The battery unit 3 is set on the mounting table 27 of the mounting device 7. In this state, the battery unit 3 is disposed such that each first stationary pin member 11A is inserted into the hole 13C through the guide portion 13D, thereby setting the battery unit 3 correctly on the mounting table 27, as shown in FIG. 16. The operating arm 19B of the lever 19 is pushed by the first pin member 11A and the lever 19 is rotated against the urging force of the coil spring in the direction C2 indicated by dashed arrow in FIG. 16. Thus, the locking arm 19A of the lever 19 is moved from the third position to the fourth position, thereby releasing the pawl 17.

In this state of the locking apparatus body 5, the mounting table 27 is moved upward in the direction indicated by the solid arrow in FIG. 16 to a position where the battery unit 3 is located adjacent to the space 1B, and the striker shaft 9B enters into the recess 13B.

Figure 17:
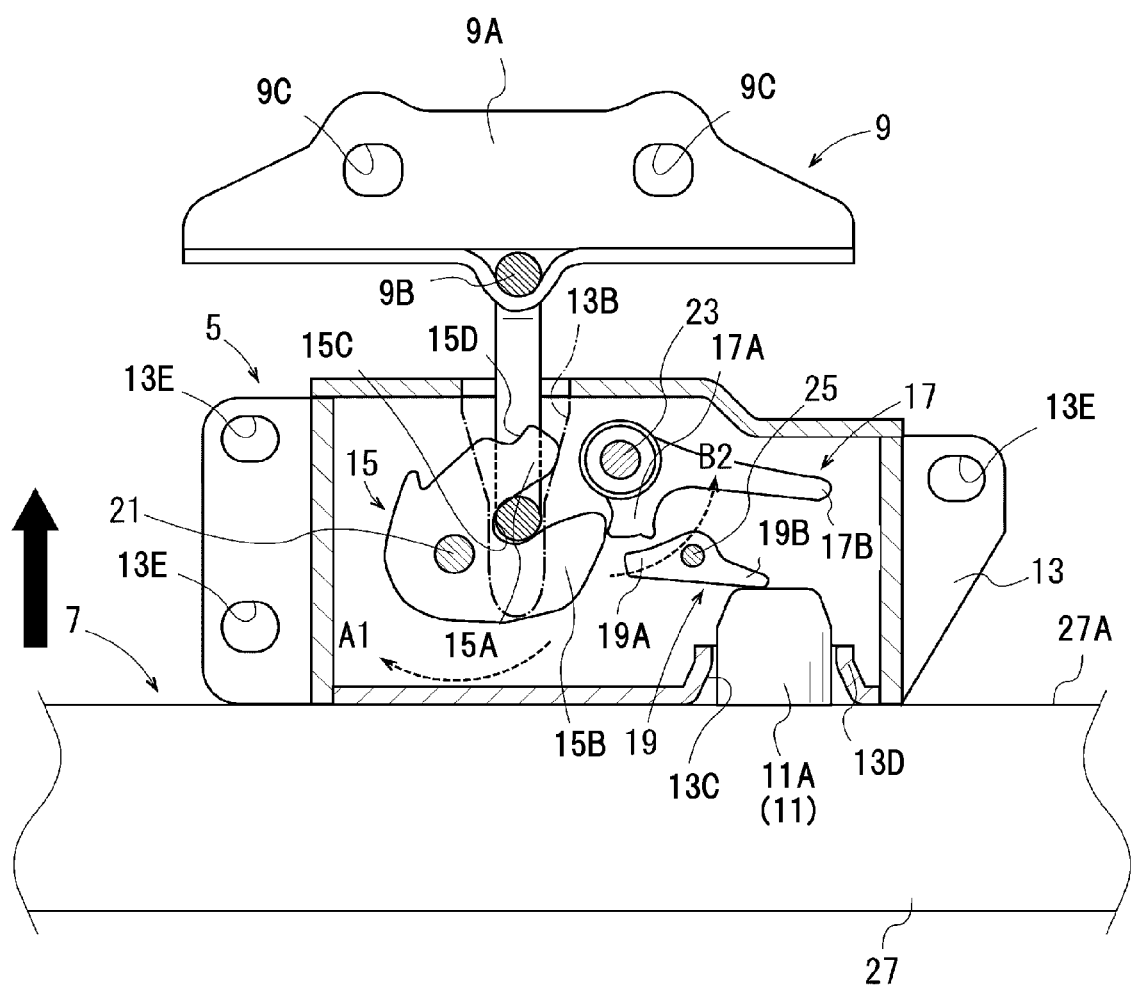
FIG. 17 is a cross-sectional view of the locking apparatus of FIG. 12, showing a state of the striker, the locking apparatus body and the mounting table while the battery unit is being moved further upward.

Referring to FIG. 17, the lower latch portion 15B of the latch 15 is brought into contact with the striker shaft 9B, so that the latch 15 is pushed by the striker shaft 9B, and the latch 15 is rotated against the urging force of the coil spring in the direction A1 indicated by dashed arrow in FIG. 17. The locking arm 17A of the pawl 17 is pushed by the lower latch portion 15B of the latch 15, so that the pawl 17 is rotated against the urging force of the coil spring in the direction B2 indicated by the dashed arrow in FIG. 17, and the locking arm 17A is moved from the first position to the second position.

Figure 18:
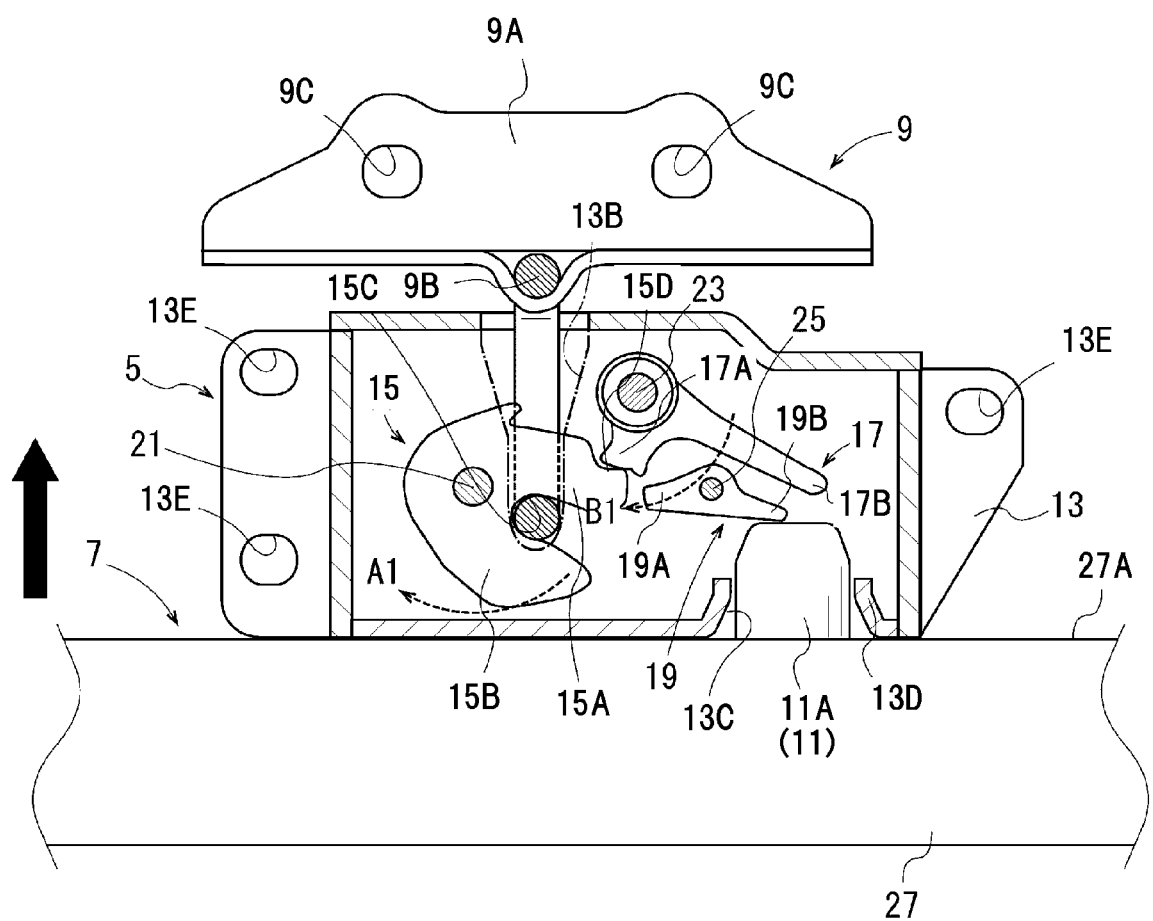
FIG. 18 is a cross-sectional view of the locking apparatus of FIG. 12, showing a state of the striker, the locking apparatus body and the mounting table when the battery unit is moved to the position of FIG. 2.

When the battery unit 3 is positioned in the space 1B as shown in FIG. 2, the pawl 17 is rotated by the urging force of the coil spring in the direction B1 indicated by dashed arrow in FIG. 18, and the locking arm 17A is moved from the second position to the first position. Thus, the locking arm 17A is engaged with the locking surface 15D of the latch 15. Therefore, the latch 15 is in the locking state where the latch 15 locks the striker shaft 9B in the recess 15C. Simultaneously, the electrical connection between the batteries in the battery unit 3 and the electric vehicle 1 is established.

Figure 19:
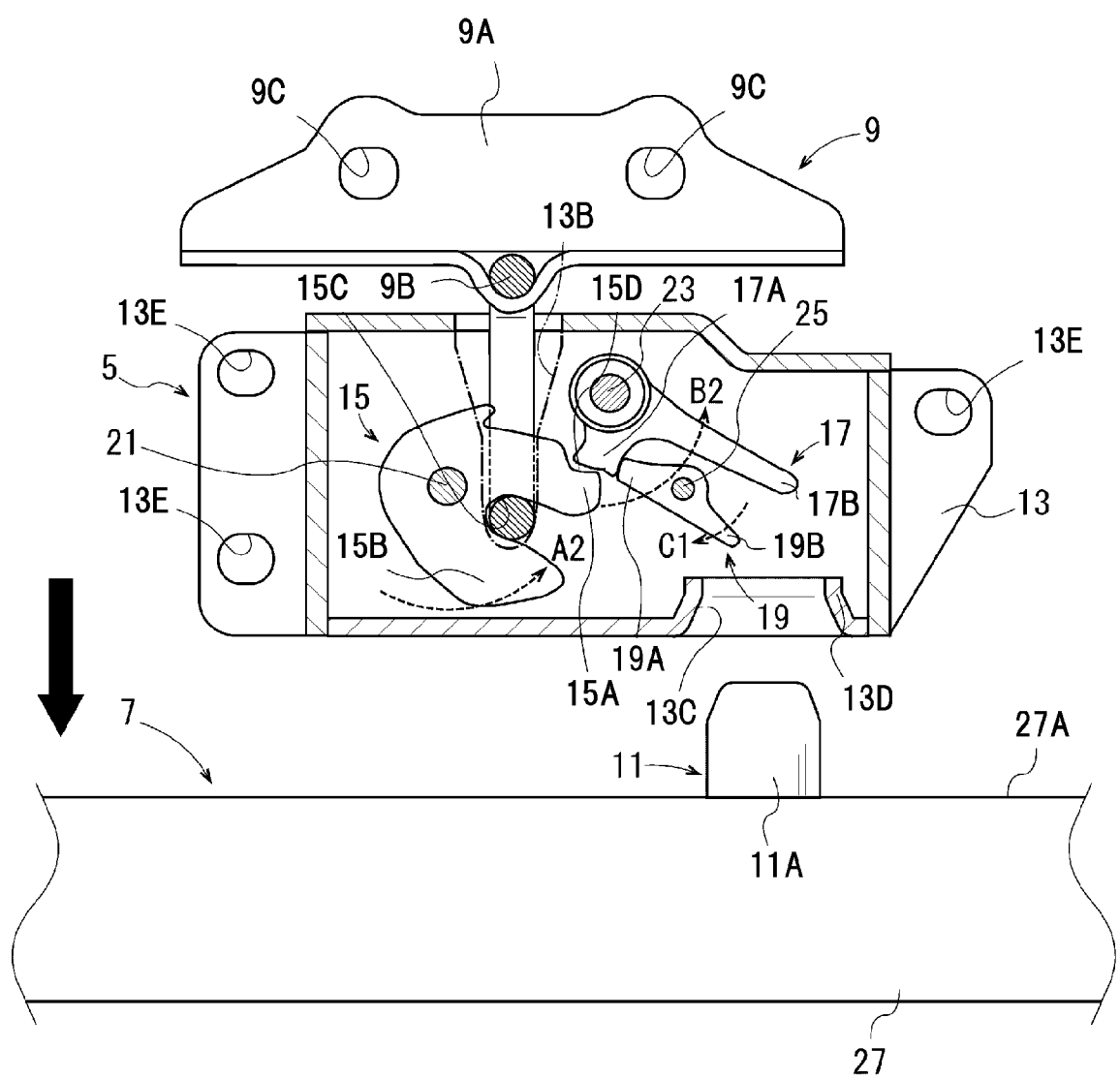
FIG. 19 is a cross-sectional view of the locking apparatus of FIG. 12, showing a state of the striker, the locking apparatus body and the mounting table when mounting of the battery unit to the vehicle body is completed.

Subsequently, the mounting table 27 is moved downward as indicated by solid arrow in FIG. 19, so that the first stationary pin member 11A is removed from the hole 13C and, therefore, the operating arm 19B of the lever 19 is released from the pushing force by the first pin member 11A. As a result, the lever 19 is rotated by the urging force of the coil spring in the direction C1, and the locking arm 19A of the lever 19 is moved from the fourth position to the third position. The locking arm 19A at the third position is locked to the locking arm 17A of the pawl 17, so that the rotation of the pawl 17 in the direction B2 is prevented and the movement of the locking arm 17A to the second position is prevented. Thus, the locking of the pawl 17 by the lever 19 is completed, and the locking of the latch 15 by the pawl 17 is also completed. Therefore, locking of the striker shaft 9B by the locking apparatus body 5 is completed and the battery unit 3 is securely locked in the space 1B.

The following will describe a procedure for removing the battery unit 3 from the vehicle body 1A. As shown in FIG. 2, the electric vehicle 1 is set at the predetermined position on the upper floor 10A of the station 10. The position of the electric vehicle 1 is adjusted such that the space 1B in the vehicle body 1A is located just above the opening 100 or the mounting device 7. The battery unit 3 is set in place in the electric vehicle 1 at the space 1B.

No battery unit such as the battery unit 3 is placed on the mounting table 27 of the mounting device 7.

Figure 20:
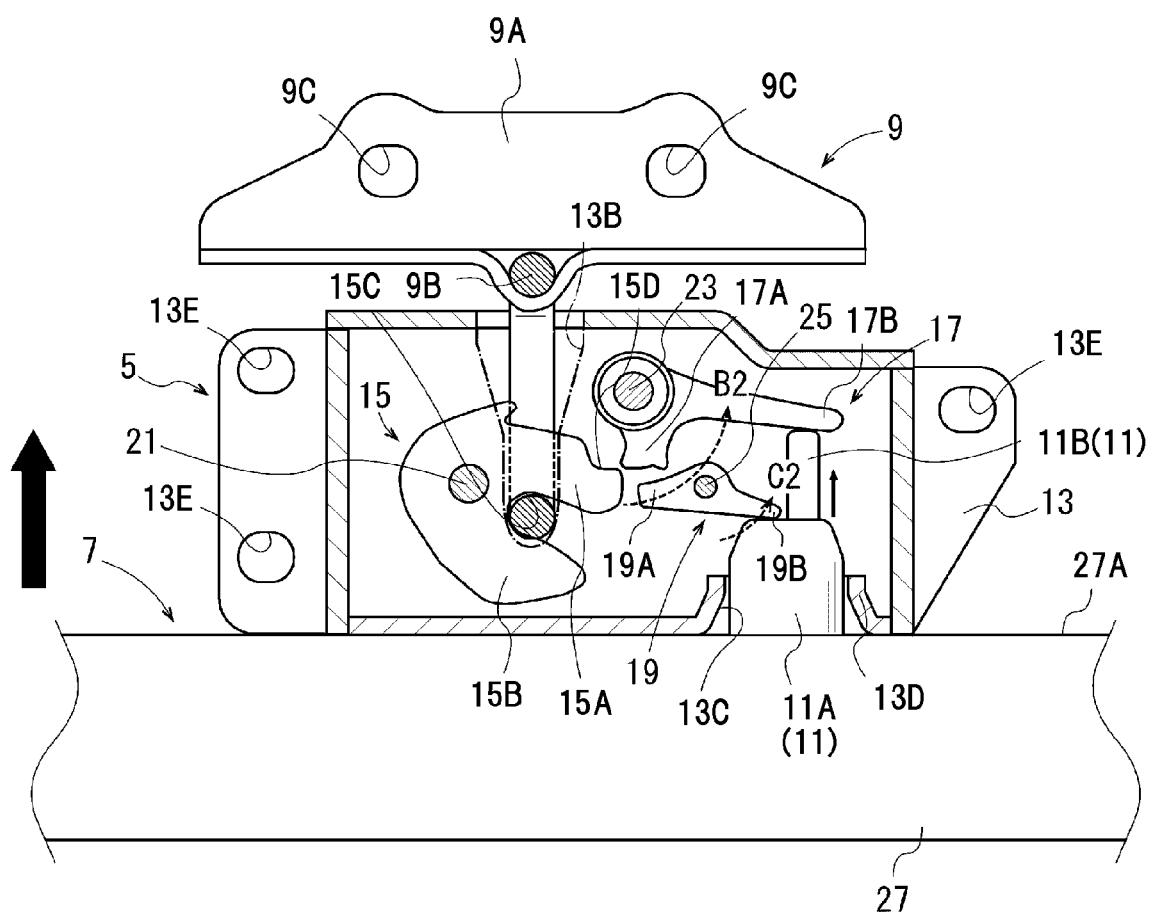
FIG. 20 is a cross-sectional view of the locking apparatus of FIG. 12, showing a state of the striker, the locking apparatus body and the mounting table while the battery unit is being removed from the vehicle body.

Referring to FIG. 20, the mounting table 27 is moved upward through the control device 7A, so that each first pin member 11A on the mounting table 27 is inserted into its corresponding hole 13C and the mounting table 27 is brought into contact with the battery unit 3 and the locking apparatus bodies 5. Since the pin device 11 is inserted into the hole 13C while being guided by the guide portion 13D, the mounting table 27 is positioned correctly with respect to the battery unit 3.

The operating arm 19B of the lever 19 is pushed by the first pin member 11A, so that the lever 19 is rotated against the urging force of the coil spring in the direction C2 indicated by dashed arrow in FIG. 20, thereby moving the locking arm 19A from the third position to the fourth position and releasing the pawl 17 from the lever 19. In this state, the second pin member 11B extends out from the first pin member 11A.

The second pin member 11B is in contact with the operating arm 17B of the pawl 17, and the operating arm 17B is pushed by the second pin member 11B, so that the pawl 17 is rotated against the urging force of the coil spring in the direction B2 shown by dashed arrow in FIG. 20, and the locking arm 17A of the pawl 17 is moved from the first position to the second position. Thus, the locking surface 15D of the latch 15 is unlocked from the locking arm 17A of the pawl 17 and, therefore, locking of the latch 15 by the pawl 17 is released.

Figure 21:
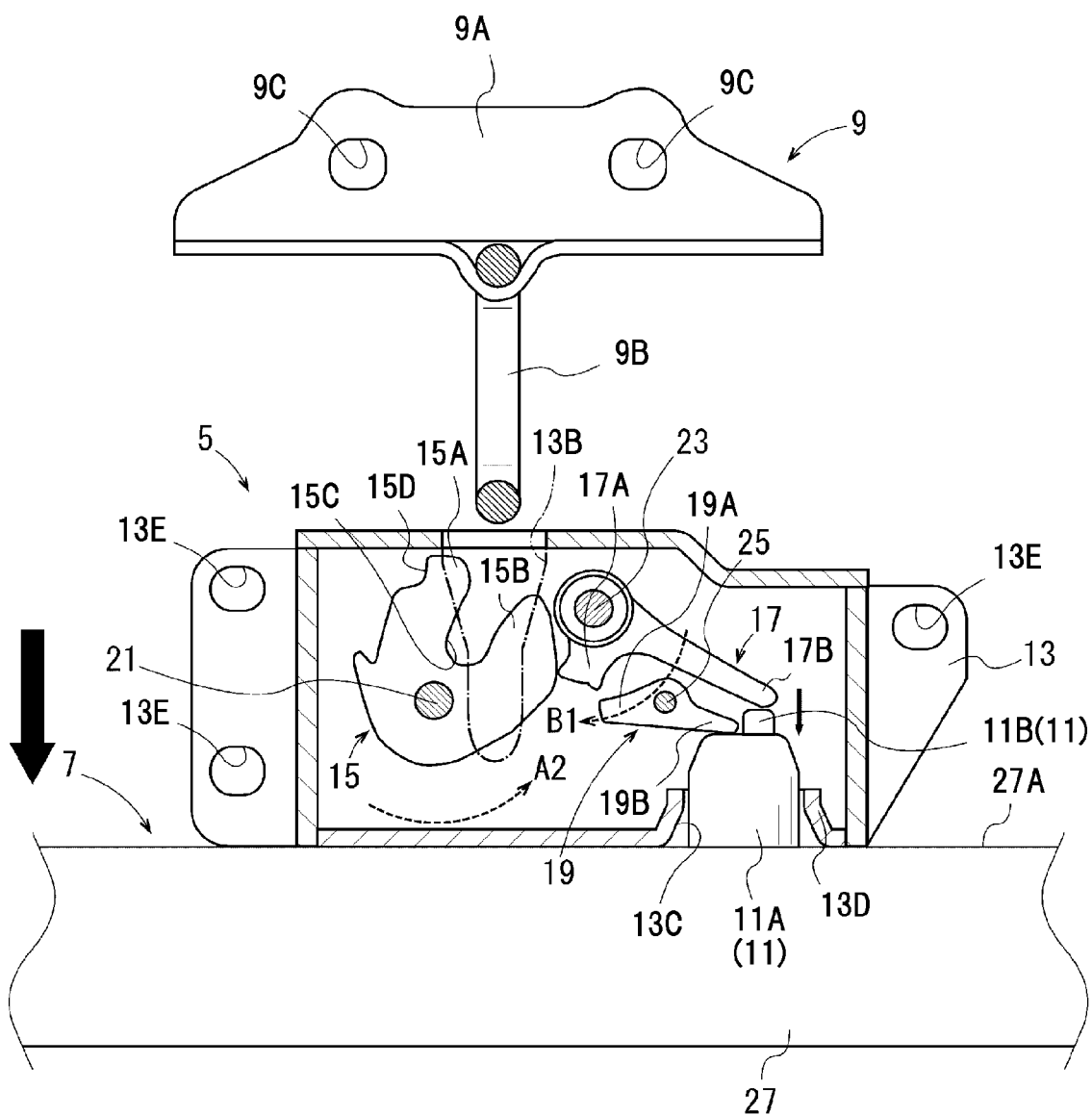
FIG. 21 is a cross-sectional view of the locking apparatus of FIG. 12, showing a state of the striker, the locking apparatus body and the mounting table while the battery unit is being moved downward.

Then, the mounting table 27 is moved downward thereby to lower the battery unit 3 from the space 1B in the direction indicated by solid arrow in FIG. 21, so that the upper latch portion 15A of the latch 15 is pushed by the striker shaft 9B to be rotated in the direction A2, and the latch 15 is placed in the releasing state. The striker shaft 9B is relatively moved in the direction away from the recess 13B and released from the locking by the locking apparatus body 5, with the result that the removing of the battery unit 3 from the vehicle body 1A is completed. Simultaneously, the electrical connection between the batteries in the battery unit 3 and the electric vehicle 1 is broken.

After the removing of the battery unit 3 is completed, the second pin member 11B is moved into the first pin member 11A, so that the operating arm 17B is released from contact engagement with the second pin member 11B. The pawl 17 is rotated in the direction B1 by the urging force of the coil spring, and the locking arm 17A is moved from the second position to the first position. Moving the battery unit 3 removed from the vehicle body 1A away from the mounting table 27, the operating arm 19B of the lever 19 is released from contact engagement with the first pin member 11A. Thus, the lever 19 is rotated in the direction C2 by the urging force of the coil spring, and the locking arm 17A of the pawl 17 is moved from the forth position to the third position. It is so controlled that the second pin member 11B enters into the first pin member 11A before the battery unit 3 is moved away from the mounting table 27, so that the second pin member 11B prevented from being damaged.

According to the locking apparatus of the second preferred embodiment of the present invention, the battery unit 3 may be locked to the vehicle body 1A only by moving the battery unit 3 upward into the space 1B by the mounting device 7. Similarly, the battery unit 3 may be removed from the vehicle body 1A only by moving the battery unit 3 downward from the space 1B through the mounting device 7. Therefore, locking and removing of the battery unit 3 to and from the vehicle body 1A may be performed easily.

According to the locking apparatus of the second preferred embodiment, the pawl 17 with its locking arm 17A placed in the first position is prevented from rotating by the lever 19. Thus, when the striker shaft 9B is locked to the locking apparatus body 5, or when the battery unit 3 is locked to the vehicle body 1A, the pawl 17 is prevented from being unexpectedly rotated in the direction B2, and the locking arm 17A is prevented from being rotated from the first position to the second position. Therefore, according to the locking apparatus of the second preferred embodiment, the latch 15 in the locking state is prevented from being unexpectedly rotated to the releasing state effectively.

The rotating direction of the pawl 17 in the direction B2 and the rotating direction of the lever 19 in the direction C2 are the same. Inserting the pin device 11 into the hole 13C from the bottom of the locking apparatus body 5, both of the lever 19 and the pawl 17 may be rotated simultaneously. Thus, the striker shaft 9B may be released easily from the locking apparatus body 5. Each pin device 11 may be made simpler in structure. The lever 19 is rotated in the same manner as the latch 15 and the pawl 17, so that the locking apparatus body 5 may be made simpler in structure.

The locking apparatus of the second preferred embodiment, the operation is easy, and the reliability is improved to offer easy and reliable locking and removing operation.

In the locking apparatus body 5, the lever 19 is urged in the direction C1, so that the locking arm 19A placed in the third position remains there when the locking arm 17A is rotated from the first position to the second position.

When the locking arm 17A of the pawl 17 being locked by the lever 19 is rotated from the first position to the second position, the locking arm 17A is brought into contact with the locking arm 19A in the third position. Thus, the pawl 17 is locked from rotating to be sufficiently stabilized, thereby improving the reliability of locking of the battery unit 3 by the locking apparatus. Therefore, in the state that the striker shaft 9B is locked by the locking apparatus body 5, the pawl 17 and the latch 15 are hardly rotated by any foreign object such stone entering into the housing 13. The striker shaft 9B securely locked by the locking apparatus body 5 is prevented from being released due to any accident.

In the locking apparatus, the pin device 11 is provided as the unlocking member and includes the first pin member 11A which is contactable with the lever 19 thereby to rotate the lever 19 in the direction C2 and the second pin member 11B which is contactable with the pawl 17 thereby to rotate the pawl 17 in the direction B2. The second pin member 11B is extendable from the first pin member 11A. The first pin member 11A and the second pin member 11B are disposed on the mounting table 27 so as to extend in the same direction.

Thus, the pin device 11 is made simple in structure and small in size. The provision of the pin device 11 on the mounting table 27 facilitates the locking and removing of the battery unit 3.

In the locking apparatus, the lever 19 and the pawl 17 are disposed such that the operating arm 19B of the lever 19 is brought into contact with the first pin member 11A and the second pin member 11B is brought into contact with the operating arm 17B of the pawl 17 after moving the locking arm 19A of the lever 19 to the fourth position. After releasing the pawl 17 from the lever 19, the latch 15 is released from the pawl 17. The releasing of the pawl 17 and the releasing of the latch 15 are performed in this order. Thus, the striker shaft 9B locked by the locking apparatus body 5 may be released smoothly.

In the locking apparatus body 5 of the locking apparatus, the latch 15 is prevented from rotating further than the first anti-rotation pin 101 shown in FIG. 13. Similarly, the pawl 17 is prevented from rotating further than the first position by the second anti-rotation pin 102, and the lever 19 is prevented from rotating further than the third position by the third anti-rotation pin 103. Thus, the provision of the first, second and the third anti-rotation pins 101, 102, 103 keeps the latch 15, the pawl 17 and the lever 19 from unnecessarily rotating, thus helping to improve the reliability in operation of the locking apparatus body 5, or the locking apparatus.

Figure 22:
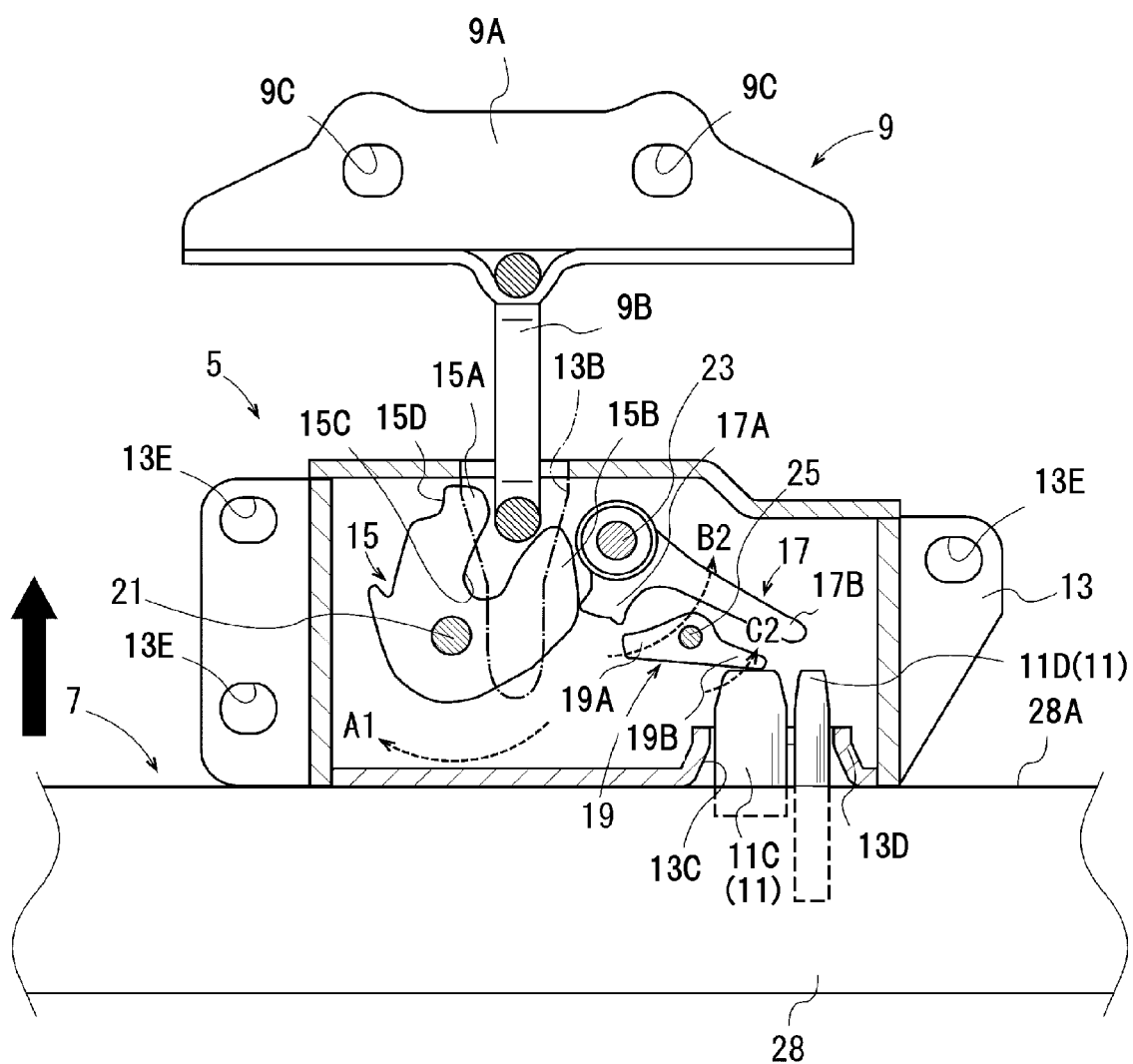
FIG. 22 is a cross-sectional view of a locking apparatus according to a third preferred embodiment of the present invention, showing a state of the striker, the locking apparatus body and the mounting table of the locking device while the battery unit is being moved upward.
Figure 23:
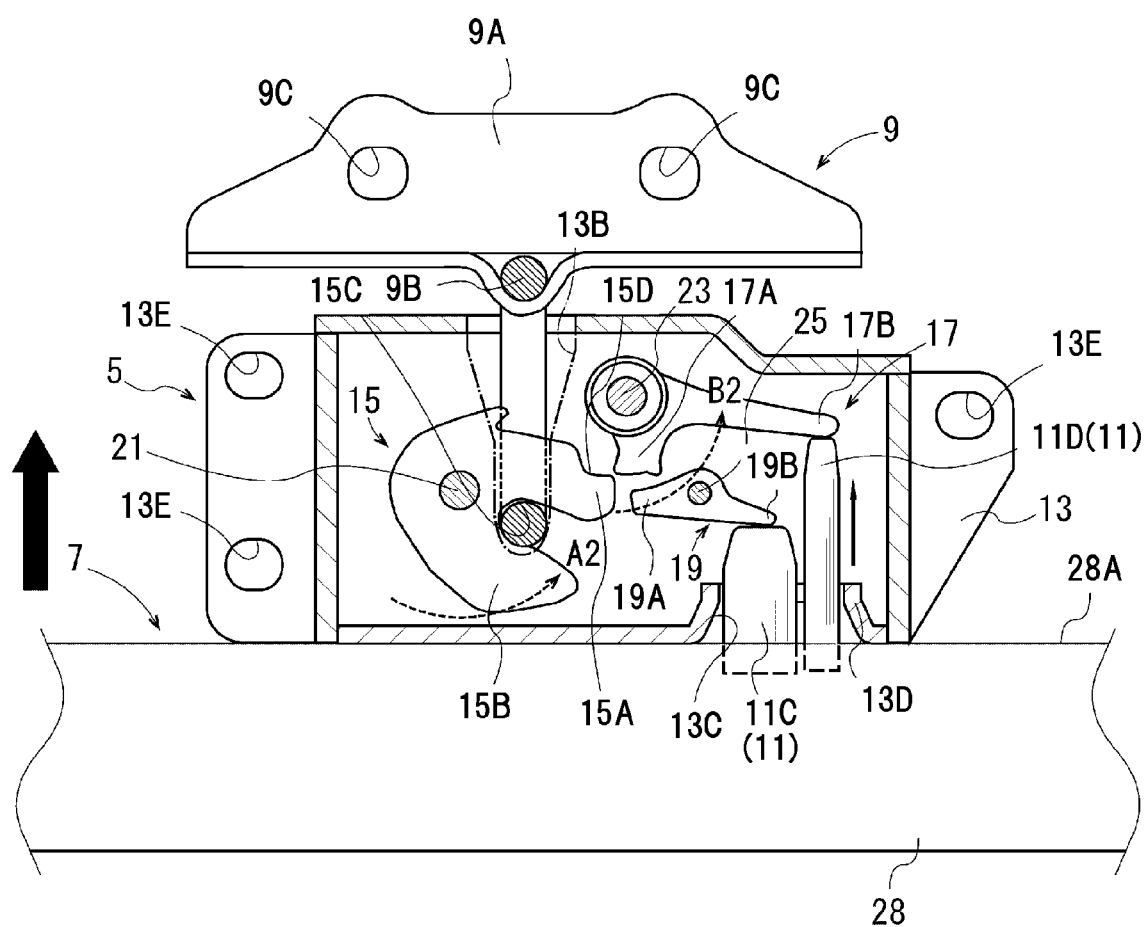
FIG. 23 is a cross-sectional view of the locking apparatus of FIG. 22, showing a state of the striker, the locking apparatus body and the mounting table while the battery unit is being removed from the vehicle body.

The following will describe a third preferred embodiment of the present invention with reference to FIGS. 22 through 23. Referring to FIG. 22, the third preferred embodiment differs from the second preferred embodiment in that the structure of each pin device 11 is modified. A mounting table 28 is disposed in the locking apparatus instead of the mounting table 27 of the mounting device 7 of the second preferred embodiment. The pin device 11 includes a first pin member 11C and a second pin member 11D which are disposed side by side in the mounting table 28.

The second pin member 11D is longer than the first pin member 11C. The second pin member 11D is movable through a surface 28A of the mounting table 28 or between the positions shown in FIGS. 22 and 23.

The hole 13C is formed through the housing 13 to allow the first pin member 11C and the second pin member 11D disposed side by side to be inserted through the hole 13C. The guide portion 13D is formed so as to guide the first pin member 11C and the second pin member 11D into the hole 13C. The same reference numerals denote components that are similar to their counterparts of the second preferred embodiment and the description of such components will be omitted.

In the locking apparatus of the third preferred embodiment, the battery unit 3 may be locked to the vehicle body 1A in the same manner as in the locking apparatus of the second preferred embodiment. When removing the battery unit 3 from the vehicle body 1A, the mounting table 28 is moved upward through the control device 7A to be brought into contact with the battery unit 3 while allowing the first pin member 11C and the second pin member 11D to be inserted through the hole 13C.

Accordingly, the operating arm 19B of the lever 19 is pushed by the first pin member 11C being inserted through the hole 13C, and the lever 19 is rotated against the urging force of the coil spring in the direction C2 indicated by the dashed arrow in FIG. 22. Thus, the pawl 17 is released from the lever 19. In this state, the second pin member 11D extends upwardly further than the first pin member 11C through the control device 7A.

Thus, the second pin member 11D is contactable with the operating arm 17B of the pawl 17 thereby to push the operating arm 17B, so that the pawl 17 is rotated against the urging force of the coil spring in the direction B2 indicated by dashed line in FIG. 22 and the locking arm 17A of the pawl 17 is moved from the first position to the second position. Thus, the latch 15 is released from the pawl 17. Then, the striker shaft 9B is released from the locking apparatus body 5 in the same manner as in the case of the locking apparatus of the second preferred embodiment. Thus, removing of the battery unit 3 from the vehicle body 1A is completed. In addition, before moving the battery unit 3 from the mounting table 28, the second pin members 11D are moved downward into the mounting table 28 to the position where the extending length of the second pin member 11D from the surface 28A of the mounting table 28 is the same or smaller than that of the first pin member 11C, so that the second pin members 11B are protected against damage. The other advantageous effects of the locking apparatus of the third preferred embodiment are the same as those of the locking apparatus of the second preferred embodiment.

Thus, according to the locking apparatus of the third preferred embodiment, the operation is easy, and the reliability is improved to offer easy and reliable locking and removing operation.

Figure 24:
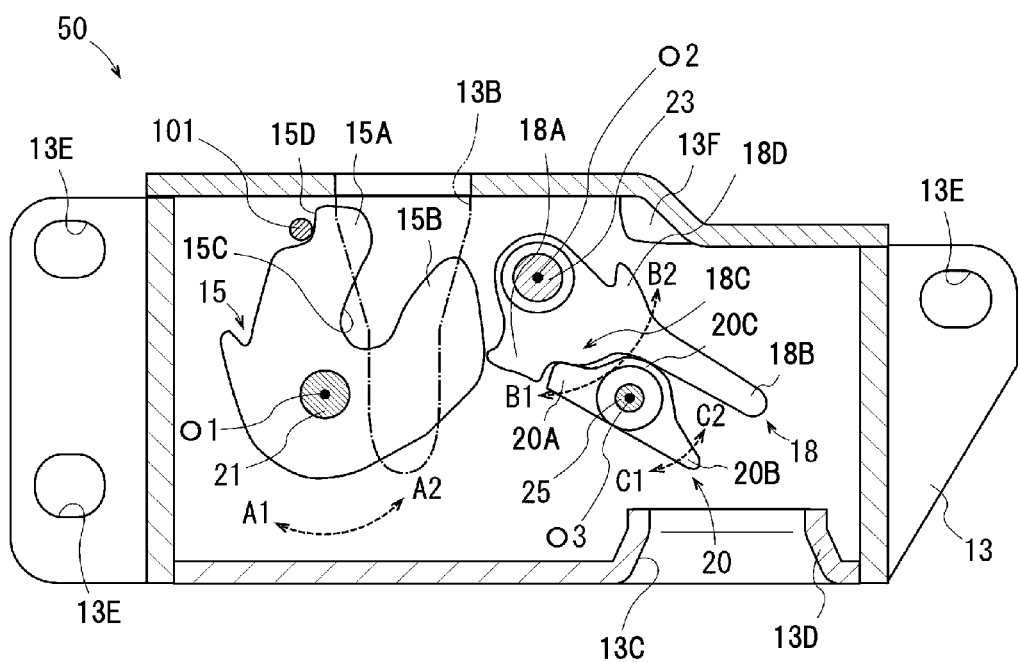
FIG. 24 is a cross-sectional view of a locking apparatus body of a locking apparatus according to a fourth preferred embodiment of the present invention.
Figure 25:
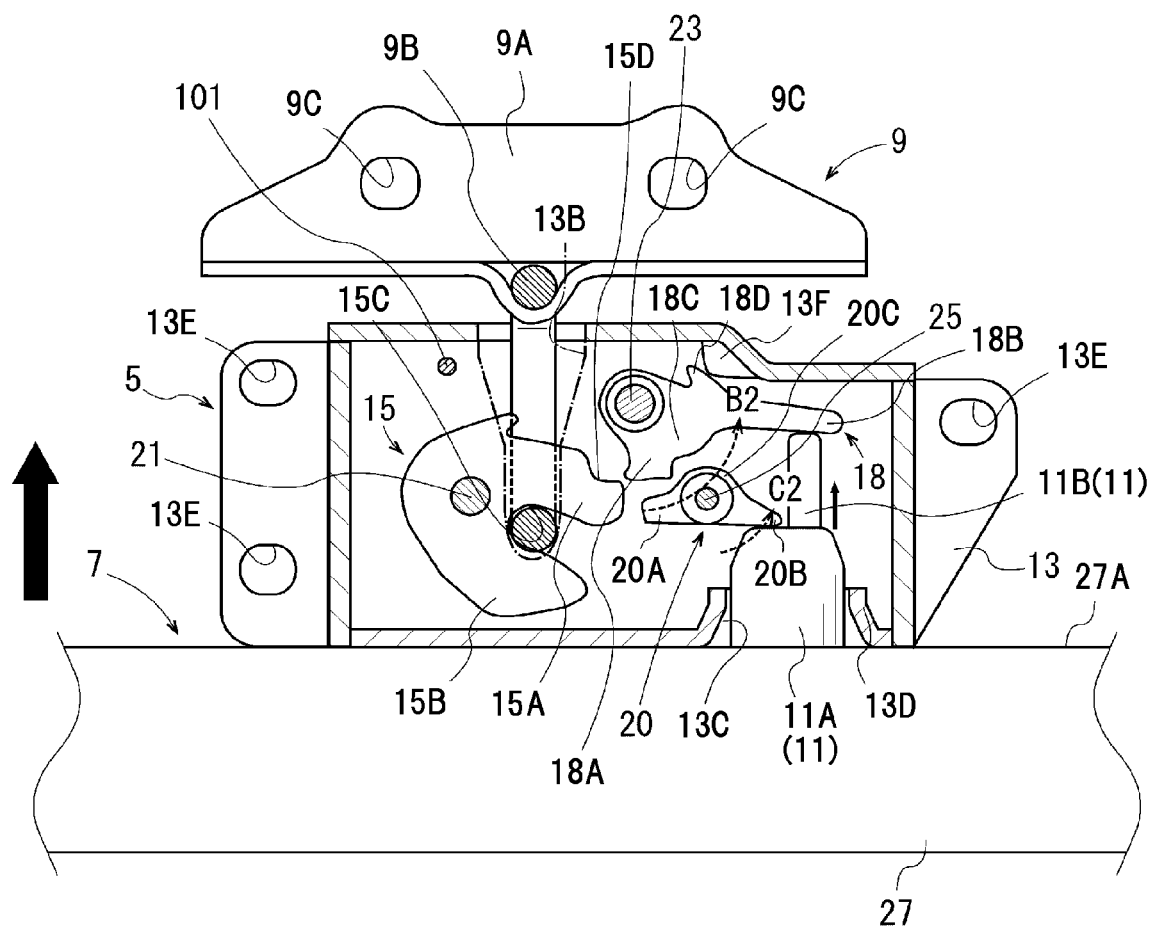
FIG. 25 is a cross-sectional view of the locking apparatus of FIG. 24, showing a state of the striker, the locking apparatus body and the mounting table while the battery unit is being removed from the vehicle body.

The following will describe a locking apparatus according to a fourth preferred embodiment of the present invention with reference to FIGS. 24 and 25. Referring to FIG. 24, numeral 50 designates the locking apparatus body of the locking apparatus of the second preferred embodiment. The locking apparatus body 50 is mounted to the battery unit 3 shown in FIG. 12.

In the fourth preferred embodiment, numerals 18 and 20 designate the pawl and the lever disposed in the locking apparatus body 50. The lever 20 serves as a pawl locking member of the present invention. In the locking apparatus body 50 of the fourth preferred embodiment, no anti-rotation pins such as the second and the third anti-rotation pins 102, 103 is provided and only the first anti-rotation pin 101 is provided in the housing 13. A projection 13F is formed in the housing 13.

The pawl 18 includes a locking arm 18A and an operating arm 18B which are formed in perpendicular relation to each other to have a substantial L-shape. The pawl 18 further includes a first projection 18C formed between the locking arm 18A and the operating arm 18B and a second projection 18D.

The pawl 18 is rotatably supported by the second rocking shaft 23 so as to rotate in the directions B1 and B2 indicated by the double-headed dashed arrow in FIG. 24. The pawl 18 is urged by a coil spring (not shown) in the direction B1. When the pawl 18 is rotated in the direction B1, the locking arm 18A is moved to the first position in which the latch 15 is prevented from rotating by the locking arm 18A. When the pawl 18 is rotated in the direction B2, the locking arm 18A is moved to the second position in which the locking arm 18A releases the latch 15. Thus, the pawl 18 is rotatable around the second axis O2 of the second rocking shaft 23, and the locking arm 18A is movable between the first position and the second position. The pawl 18 is rotatable in the direction B2 until the second projection 18D is brought into contact with the projection 13F.

The lever 20 includes a locking arm 20A at one end and an operating arm 20B at the other end. The lever 20 further includes an arcuate portion 20C formed between the locking arm 20A and the operating arm 20B with its apex located at the substantial center of the lever 20.

The lever 20 is rotatably supported by the third rocking shaft 25 at the substantial center thereof so as to rotate in directions C1 and C2. The lever 20 is urged by a coil spring (not shown) in the direction C1. When the lever 20 is rotated in the direction C1, the locking arm 20A of the lever 20 is moved to the third position in which the pawl 18 is locked by the locking arm 20A. When the lever 20 is rotated in the direction C2, the locking arm 20A of the lever 20 is moved to the fourth position in which the pawl 18 is released from the locking arm 20A. The lever 20 is rotatable around the third axis O3 of the third rocking shaft 25 and the locking arm 20A is movable between the third position and the fourth position.

According to the locking apparatus body 50 of the fourth preferred embodiment, the rotating direction of the locking arm 18A of the pawl 18 from the first position to the second position and the rotating direction of the locking arm 20A of the lever 20 from the third position to the fourth position are substantially the same. The rotating direction B2 of the pawl 18 and the rotating direction C2 of the lever 20 are substantially the same with respect to the second and the third axes O2, O3 of the second and the third rocking shafts 23, 25. Therefore, the locking arm 20A that is located on the left side of the third axis O3 of the third rocking shaft 25 as seen in FIG. 24 is urged to a position adjacent to the first projection 18C of the pawl 18 that is located on the right side of the second axis O2 of the second rocking shaft 23 as seen in FIG. 24.

In the state that the pawl 18 is urged in the direction B1 and the lever 20 is urged in the direction C1 and, therefore, the first projection 18C is brought into contact with the locking arm 20A and the operating arm 18B is brought into contact with the arcuate portion 20C, respectively. The rest of the structure of the locking apparatus body 50 and the locking apparatus of the fourth preferred embodiment are the same as that of the locking apparatus of the second preferred embodiment.

In the locking apparatus of the fourth preferred embodiment, the battery unit 3 is locked to and removed from the vehicle body 1A in the same manner as in the case of locking apparatus of the second preferred embodiment as described with reference to FIG. 16 though 21

Specifically, in the locking apparatus body 50 of the locking apparatus, when the operating arm 18B of the pawl 18 is pushed by the second pin member 11B and the pawl 18 is rotated in the direction B2 against the urging force of the coil spring, the second projection 18D of the pawl 18 is brought into contact with the projection 13F of the housing 13. Thus, the pawl 18 is prevented from unnecessarily rotating in the direction B2. According to the locking apparatus of the fourth preferred embodiment, when removing the battery unit 3 from the vehicle body 1A, the pawl 18 is prevented from being removed from the coil spring and, therefore, removing of the battery unit 3 may be performed desirably.

In the locking apparatus body 50 of the locking apparatus, the first projection 18C and the locking arm 20A are contactable with each other to prevent the locking arm 18A from moving further than the first position. Similarly, the operating arm 18B of the pawl 18 and the arcuate portion 20C are contactable with each other, so that the locking arm 20A of the lever 20 is prevented from moving further than the third position. In the locking apparatus body 50, the pawl 18 and the lever 20 serve as the anti-rotation member for the lever 20 and the pawl 18, respectively.

According to the locking apparatus body 50, unnecessary rotation of the pawl 18 and the lever 20 may be prevented successfully without providing anti-rotation members such as the second and the third anti-rotation pins 102, 103 in FIG. 13. Since the rotating directions of the pawl 18 and the lever 20 are substantially the same, the lever 20 and the pawl 18 are suitable as the anti-rotation members for the pawl 18 and the lever 20, respectively. For the reasons stated above, the manufacturing of the locking apparatus body 50 is facilitated and the cost of the locking apparatus including the locking apparatus body 50 is reduced, accordingly, and the reliability in operation is improved. The other advantageous effects are the same as those of the second preferred embodiments.

Therefore, the locking apparatus of the fourth preferred embodiment offers easy, and the reliability is improved to offer easy and reliable locking and removing operation.

The present invention is not limited to the above-described first through fourth preferred embodiments, but may be modified, for example, into the following alternative embodiments.

Alternatively, a detection member for detecting whether the latch 15 is in the locking state or the releasing state and generating a detection signal indicative of such states may be used, so that the control device 7A may move the locking pin 24 in either direction according to the detection signals. This may prevent an erroneous operation in the mounting and removing operations of the battery unit 3.

Alternatively, a detection member for detecting whether the latch 15 is in the locking state or the releasing state and generating a detection signal indicative of such states may be used, so that the control device 7A may move the second pin members 11B, 11D in either direction according to the detection signals. This may prevent an erroneous operation in the mounting and removing operations of the battery unit 3.

Alternatively, a plurality of recesses may be formed in the case 3A and each locking apparatus body 5 may be disposed into the each recess. In this structure, each locking apparatus body 5 may be mounted to the case 3A without extending out from the battery unit 3, thereby allowing the space 1B to be smaller.

Alternatively, the housing 13 may be used as the anti-rotation member for the latch 15 instead of the first anti-rotation pin 101. In this case, the housing 13 is modified into such in shape that the latch 15 in the releasing state is contactable with the housing 13 so that the housing 13 may serve as anti-rotation member for the latch 15. Furthermore, the housing 13 may be formed with a projection that is contactable with the latch 15 in the releasing state so that the housing 13 may serve as the anti-rotation member for the latch 15.

What is claimed is:
1. A locking apparatus for a vehicle comprising:
a striker;
a locking apparatus body configured to lock and release the striker, the locking apparatus body including:
a housing including a recess for receiving the striker;
a first rocking shaft disposed in the housing, the first rocking shaft having a first axis;
a second rocking shaft disposed in the housing, the second rocking shaft having a second axis;

a latch supported by the first rocking shaft so as to be rotatable relative to the housing around the first axis between a locking position in which the latch locks the striker in the recess and a releasing position in which the latch releases the striker in the recess;

a pawl configured to lock the latch, the pawl supported by the second rocking shaft so as to be rotatable relative to the housing around the second axis between a first position in which the pawl locks the latch and a second position in which the pawl releases the latch; and an unlocking member used for rotating the pawl from the first position to the second position, an unlocking member including a pin device control mechanism controlling a pin device so as to extend to a first length in which the pin device is apart from the pawl when the pin device is inserted into a hole of housing and a second length in which the pin device is brought into contact with the pawl to rotate the pawl from the first position to the second position, wherein the locking apparatus body locks the striker when moving the housing to the striker and is operable in the housing.

2. The locking apparatus according to claim 1, wherein the housing includes a guide portion for guiding the pin device inserted into the hole.

3. The locking apparatus according to claim 1, wherein the locking apparatus body further includes a pawl locking member used for locking and releasing the pawl.

4. The locking apparatus according to claim 3, wherein the pawl locking member is extended in the housing parallel to the second axis.

5. The locking apparatus according to claim 3, wherein the unlocking member includes a pin device control mechanism controlling a pin device and the pin device is used for releasing the pawl locked by the pawl locking member to move the pawl from the first position to the second position.

6. A locking apparatus for a vehicle used in a battery unit mounting apparatus for a vehicle by which a battery unit is moved to a predetermined mounting position with respect to a vehicle body and the battery unit is mounted to the vehicle body, the locking apparatus comprising:

a striker mounted to the vehicle body;

a locking apparatus body mounted to the battery unit, the locking apparatus body configured to lock and release the striker, the locking apparatus body including:

a housing including a recess for receiving the striker, the housing having a hole opened in the bottom surface of the housing;

a first rocking shaft disposed in the housing, the first rocking shaft having a first axis;

a second rocking shaft disposed in the housing and having a second axis;

a latch supported by the first rocking shaft so as to be rotatable relative to the housing around the first axis between a locking position in which the latch locks the striker in the recess and a releasing position in which the latch releases the striker in the recess;

a pawl configured to lock the latch, the pawl supported by the second rocking shaft so as to be rotatable relative to the housing around the second axis between a first position in which the pawl locks the latch and a second position in which the pawl releases the latch;

a mounting device configured to move the battery unit to the mounting position and to move the battery unit from the mounting position, the mounting device including:

a mounting table on which the battery unit is set; and an elevating mechanism used for elevating the mounting table; and an unlocking member configured to rotate the pawl from the first position to the second position when removing the battery unit from the vehicle body, the unlocking member including:

a pin device disposed on the mounting table and extending upwardly from the mounting table; and a pin device control mechanism controlling the pin device so as to extend to a first length in which the pin device is inserted into the hole and the battery unit is set on the mounting table and a second length in which the pin device is brought into contact with the pawl to rotate the pawl from the first position to the second position, wherein the locking apparatus body locks the striker when moving the battery unit to the mounting position.

7. The locking apparatus according to claim 6, wherein the mounting table includes a detection member detecting a contact between the battery unit and the mounting table and generating a detection signal when removing the battery unit from the vehicle body and a control device controlling the pin device drive mechanism so as to extend the pin device from the first length to the second length.

8. The locking apparatus according to claim 6, wherein the housing includes a guide portion for guiding the pin device inserted into the hole.

9. The locking apparatus according to claim 6, wherein the locking apparatus body further includes a pawl locking member used for locking and releasing the pawl.

* * * * *